(12) United States Patent
Tamaki et al.

(10) Patent No.: US 9,377,658 B2
(45) Date of Patent: Jun. 28, 2016

(54) LIQUID CRYSTAL DISPLAY DEVICE AND ELECTRONIC APPARATUS

(71) Applicant: Japan Display Inc., Tokyo (JP)

(72) Inventors: Masaya Tamaki, Tokyo (JP); Toshiharu Matsushima, Tokyo (JP)

(73) Assignee: Japan Display Inc., Tokyo (JP)

( * ) Notice: Subject to any disclaimer, the term of this patent is extended or adjusted under 35 U.S.C. 154(b) by 7 days.

(21) Appl. No.: 14/226,228

(22) Filed: Mar. 26, 2014

(65) Prior Publication Data

US 2014/0293175 A1    Oct. 2, 2014

(30) Foreign Application Priority Data

Mar. 29, 2013   (JP) .................................. 2013-075001
Mar. 20, 2014   (JP) .................................. 2014-059227

(51) Int. Cl.
*G02F 1/1343*    (2006.01)
*G02F 1/1337*    (2006.01)
*G02F 1/1365*    (2006.01)

(52) U.S. Cl.
CPC ........ *G02F 1/134363* (2013.01); *G02F 1/1365* (2013.01); *G02F 1/133707* (2013.01); *G02F 1/133784* (2013.01); *G02F 2001/134318* (2013.01); *G02F 2201/124* (2013.01)

(58) Field of Classification Search
CPC ............ G02F 1/134363; G02F 1/1337; G02F 1/133707; G02F 2201/124; G02F 1/1365; G02F 2001/134318; G02F 1/133784
USPC ........................................... 349/141, 33, 128
See application file for complete search history.

(56) References Cited

U.S. PATENT DOCUMENTS

| | | | | |
|---|---|---|---|---|
| 8,384,867 | B2* | 2/2013 | Ishii .............................. | 349/139 |
| 8,681,298 | B2* | 3/2014 | Yoshida et al. ............... | 349/129 |
| 2008/0094558 | A1* | 4/2008 | Wang et al. .................... | 349/123 |
| 2013/0154911 | A1* | 6/2013 | Chen et al. ...................... | 345/87 |
| 2014/0160386 | A1* | 6/2014 | Toko ................................ | 349/42 |
| 2014/0192298 | A1* | 7/2014 | Sumiyoshi ...................... | 349/96 |
| 2015/0042922 | A1* | 2/2015 | Kawahira et al. ............... | 349/61 |

FOREIGN PATENT DOCUMENTS

| JP | 2008-052161 | 3/2008 |
|---|---|---|
| KR | 2003-0063131 A | 7/2003 |

OTHER PUBLICATIONS

Korean Office Action mailed Jun. 1, 2015 for corresponding Korean Application No. 10-2014-0035605.

* cited by examiner

*Primary Examiner* — Michael Caley
*Assistant Examiner* — Adam C Chen
(74) *Attorney, Agent, or Firm* — Michael Best & Friedrich LLP

(57) ABSTRACT

According to an aspect, a liquid crystal display device includes a first electrode having a plurality of electrode base portions that extend in a first direction; a plurality of first comb-shaped portions that protrude from each of the plurality of electrode base portions in a second direction; and a plurality of second comb-shaped portions that protrude from each of the plurality of electrode base portions in an opposite direction to the second direction. Front edges of the first comb-shaped portions and the second comb-shaped portions that extend from the adjacent electrode base portions face each other with a gap therebetween, respectively. Transmission ineffective areas are formed at portions between the front edges facing each other, respectively, and not continuously aligned.

13 Claims, 22 Drawing Sheets

LIQUID CRYSTAL DISPLAY DEVICE AND ELECTRONIC APPARATUS

CROSS-REFERENCE TO RELATED APPLICATIONS

This application claims priority from Japanese Application No. 2013-075001, filed on Mar. 29, 2013, and Japanese Application No. 2014-059227, filed on Mar. 20, 2014, the contents of which are incorporated by reference herein in its entirety.

BACKGROUND

1. Technical Field

The present disclosure relates to a liquid crystal display device with liquid crystal. The present disclosure also relates to an electronic apparatus including a liquid crystal display device with liquid crystal.

2. Description of the Related Art

As a system (mode) of driving liquid crystal, a liquid crystal drive system using an electric field generated in a vertical direction between substrates, i.e., a vertical electric field is known. As a liquid crystal display device that drives liquid crystal using the vertical electric field, a liquid crystal display device of a vertical electric field type such as a twisted nematic (TN) type, a vertical alignment (VA) type, and an electrically controlled birefringence (ECB) type is known. In addition, as described in Japanese Patent Application Laid-open Publication No. 2008-52161 (JP-A-2008-52161), as a system of driving liquid crystal, a liquid crystal drive system using an electric field generated in a direction parallel (horizontal direction) to a substrate, i.e., a horizontal electric field is known. As the liquid crystal display device that drives liquid crystal using the horizontal electric field, a liquid crystal display device of the horizontal electric field type such as a fringe field switching (FFS) type and an in-plane switching (IPS) type is also known.

The horizontal electric field type liquid crystal display device is configured to form an electric field between a first electrode and a second electrode in a direction parallel to a substrate to rotate liquid crystal molecules in a plane parallel to the substrate surface and perform a display using a change in light transmittance corresponding to the rotation of the liquid crystal molecules. The horizontal electric field type display device is required to improve a response speed of the liquid crystal. A light transmission loss is likely to occur caused by manufacturing variations depending on a shape of the first electrode or the second electrode that improves the response speed.

For the foregoing reasons, there is a need for a liquid crystal display device and an electronic apparatus capable of improving a response speed and reducing a light transmission loss.

SUMMARY

According to an aspect, a liquid crystal display device includes: a first substrate and a second substrate that face each other; a liquid crystal layer provided between the first substrate and the second substrate; and a first electrode and a second electrode provided between the first substrate and the liquid crystal layer. The first electrode includes: a plurality of electrode base portions that extend in a first direction; a plurality of first comb-shaped portions that protrude from each of the plurality of electrode base portions at a fixed distance away in the first direction from each other in a comb-teeth manner, and extend in a second direction different from the first direction; and a plurality of second comb-shaped portions that protrude from each of the plurality of electrode base portions at a fixed distance away in the first direction from each other in a comb-teeth manner, and extend in an opposite direction to the second direction. Front edges of the first comb-shaped portions and the second comb-shaped portions that extend from the adjacent electrode base portions face each other with a gap therebetween, respectively. Transmission ineffective areas are formed at portions between the front edges facing each other, respectively. The transmission ineffective areas are not continuously aligned in the first direction.

According to another aspect, an electronic apparatus includes: a liquid crystal display device; and a control device that supplies an input signal to the liquid crystal display device.

DETAILED DESCRIPTION

Exemplary embodiments of the present disclosure will be explained in detail below with reference to the accompanying drawings. The present disclosure is not limited by the contents described in the following embodiments. In addition, the components described as follows include those which can be easily conceived by persons skilled in the art and those which are substantially identical thereto. Moreover, the components described as follows can be arbitrarily combined with each other. The explanation is performed in the following order.

1. Embodiments (Liquid Crystal Display Device)
1-1. First Embodiment
1-2. Second Embodiment
1-3. Third Embodiment
1-4. Fourth Embodiment
1-5. Modifications
2. Application Examples (Electronic Apparatuses)

Examples of applying the liquid crystal display device according to one of the embodiments or the modifications thereof to electronic apparatuses.

3. Aspects of Present Disclosure

1. Embodiments

Liquid Crystal Display Device 1-1. First Embodiment

Figure 1:
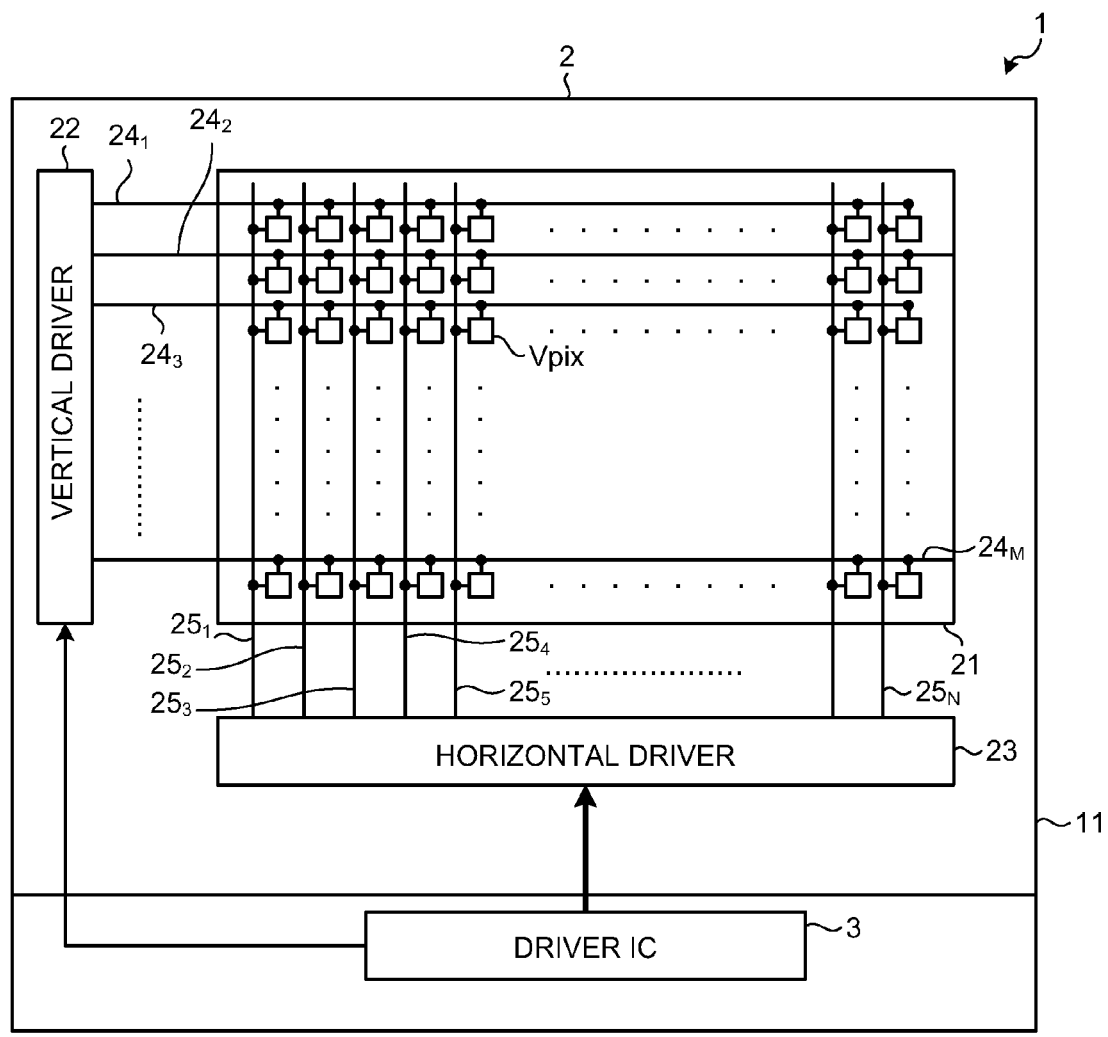
FIG. 1 is a block diagram of a system configuration example of a liquid crystal display device according to a first embodiment.

FIG. 1 is a block diagram of a system configuration example of a liquid crystal display device according to a present embodiment. A liquid crystal display device 1 corresponds to a specific example of "liquid crystal display device" according to the present disclosure.

The liquid crystal display device 1 is a transmissive liquid crystal display device, and includes a display panel 2 and a driver integrated circuit (IC) 3. Flexible printed circuits (FPC) (not illustrated) transmit an external signal and/or drive power for driving the driver IC 3 to the driver IC 3. The display panel 2 include a translucent insulating substrate such as a glass substrate 11, a display area 21 provided on the surface of the glass substrate 11 and on which a number of pixels including liquid crystal cells are arranged in a matrix (in the form of rows and columns), a horizontal driver (horizontal drive circuit) 23, and a vertical driver (vertical drive circuit) 22. The glass substrate 11 includes a first substrate, on which a number of pixel circuits including active elements (e.g., transistors) are arranged in a matrix, and a second substrate arranged opposite to the first substrate with a predetermined gap. The gap between the first substrate and the second substrate is maintained to a predetermined gap by photo spacers formed and disposed at locations on the first substrate. The liquid crystal is sealed between the first substrate and the second substrate.

System Configuration Example of Liquid Crystal Display Device

The display panel 2 includes the display area 21, the driver IC 3 having functions of an interface (I/F) and a timing generator, the vertical driver 22, and the horizontal driver 23 on the glass substrate 11.

In the display area 21, pixels Vpix that include a liquid crystal layer have a matrix structure in which units each forming one pixel on the display are arranged in M rows×N columns. In this specification, the row indicates a pixel row having N pieces of pixels Vpix arrayed in one direction. The column indicates a pixel column having M pieces of pixels Vpix arrayed in a direction perpendicular to the direction in which the pixels Vpix included in the row are arrayed. The values of M and N are determined according to a vertical display resolution and a horizontal display resolution. In the display area 21, each of scan lines $24_1, 24_2, 24_3 \ldots 24_M$ is wired in each row and each of data lines $25_1, 25_2, 25_3 \ldots 25_N$ is wired in each column with respect to an M-row/N-column array of the pixels Vpix. In the present embodiment, scan lines 24 may be hereinafter described as a representative of the scan lines $24_1, 24_2, 24_3 \ldots 24_M$, and data lines 25 may be hereinafter described as a representative of the data lines $25_1, 25_2, 25_3 \ldots 25_N$. Moreover, in the present embodiment, arbitrary three scan lines of the scan lines $24_1, 24_2, 24_3 \ldots 24_M$ are described as scan lines $24_m, 24_{m+1}$, and $24_{m+2}$ (where m is a natural number satisfying m≤M−2), and arbitrary three data lines of the data lines $25_1, 25_2, 25_3 \ldots 25_N$ are described as data lines $25_n, 25_{n+1}$, and $25_{n+2}$ (where n is a natural number satisfying N≤N−2).

The liquid crystal display device 1 receives a master clock, a horizontal synchronization signal, and a vertical synchronization signal, which are external signals, input from an external device, and supplies the signals to the driver IC 3. The driver IC 3 converts the level of the master clock, the horizontal synchronization signal, and the vertical synchronization signal each of which has a voltage magnitude of an external power supply to a voltage magnitude of an internal power supply required for driving the liquid crystal, to generate a master clock, a horizontal synchronization signal, and a vertical synchronization signal. The driver IC 3 supplies the generated master clock, horizontal synchronization signal, and vertical synchronization signal to the vertical driver 22 and the horizontal driver 23 respectively. The driver IC 3 generates common potential for a common electrode COM, explained later, for each pixel Vpix, to be commonly applied to the pixels, and applies the generated common potential to the display area 21.

The vertical driver 22 synchronizes a vertical clock pulse to sequentially sample display data output from the driver IC 3 in one horizontal period for latching. The vertical driver 22 sequentially outputs the latched one-line digital data as a vertical scan pulse to be supplied to the scan lines $24_m, 24_{m+1}$, and $24_{m+2}$ ... of the display area 21, and thereby sequentially selects pixels Vpix row by row. The vertical driver 22 sequentially outputs the digital data from, for example, an upper side of the scan lines $24_m, 24_{m+1}$, and $24_{m+2}$ ... of the display area 21, i.e., from an upper direction of vertical scanning to a lower side of the display area 21, i.e., to a lower direction of the vertical scanning. The vertical driver 22 can also sequentially output the digital data from the lower side of the scan lines $24_m, 24_{m+1}$, and $24_{m+2}$ ... of the display area 21, i.e., from the lower direction of the vertical scanning to the upper side of the display area 21, i.e., to the upper direction of the vertical scanning.

The horizontal driver 23 is supplied with, for example, 6-bit R (red), G (green), and B (blue) digital video data Vsig. The horizontal driver 23 writes display data to each pixel Vpix of a row selected through vertical scanning performed by the vertical driver 22 for each pixel, or for each pixels, or for all pixels at one time via the data lines 25.

In the liquid crystal display device 1, when a direct voltage having the same polarity is continuously applied to a liquid crystal element, this possibly causes deterioration of specific resistance (substance-specific resistance) of the liquid crystal, or the like. The liquid crystal display device 1 adopts a drive system for inverting the polarity of a video signal in a predetermined period with respect to a common potential VCOM of a drive signal in order to prevent deterioration of the specific resistance (substance-specific resistance) of the liquid crystal, or the like.

As the drive system for the liquid crystal display panel, drive systems such as line inversion drive system, dot inversion drive system, and frame inversion drive system are known. The line inversion drive system is a drive system of inverting the polarities of video signals in a time period of 1H (H: horizontal period) corresponding to one line (one pixel row). The dot inversion drive system is a drive system of alternately inverting the polarities of video signals for each pixels on the left, right, top, and bottom adjacent to each other. The frame inversion drive system is a drive system of inverting video signals, which are written to all pixels for each frame corresponding to one screen, with the same polarity at one time. The liquid crystal display device 1 can adopt any one of the drive systems.

Configuration Example of Display Area

Figure 2:
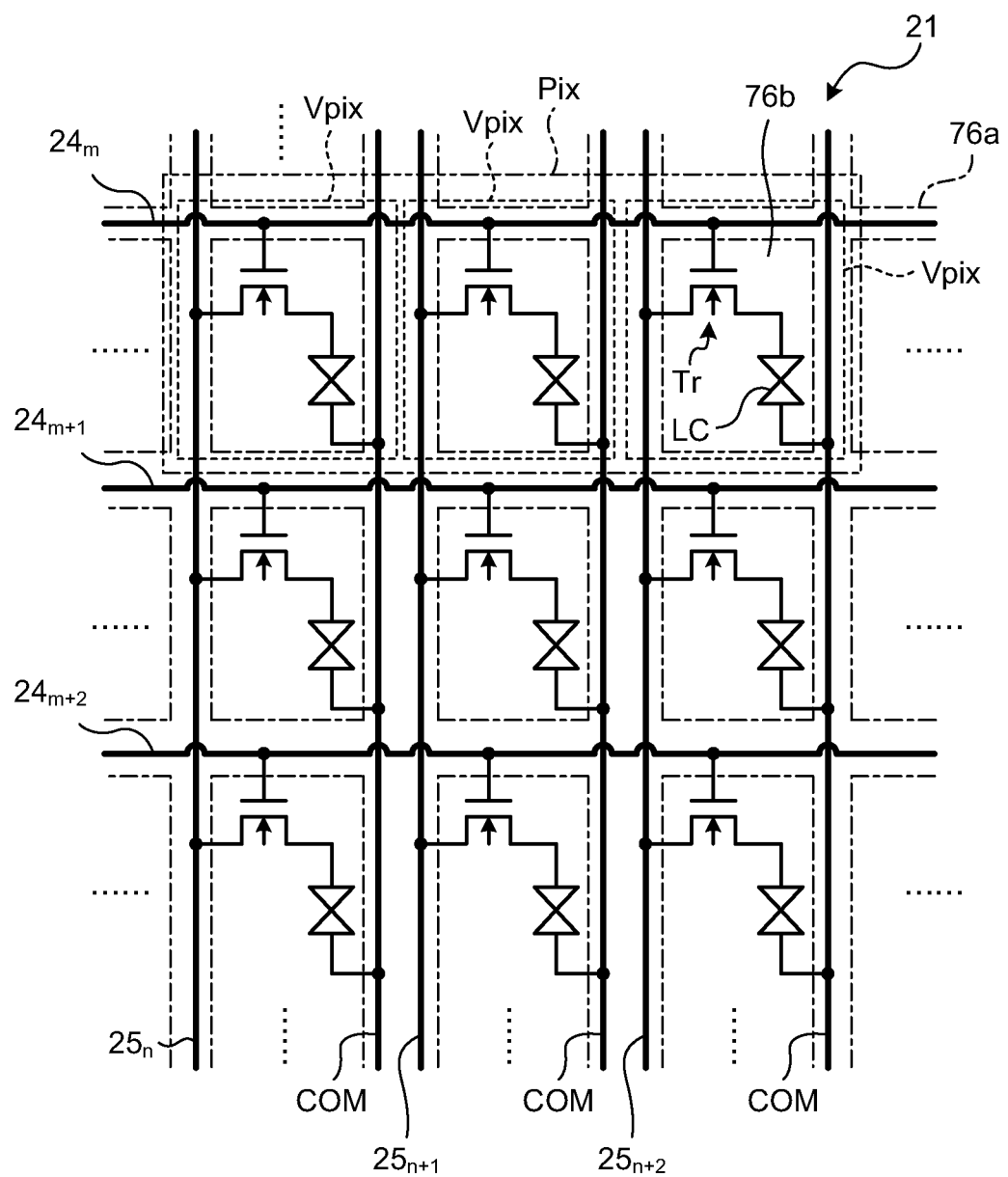
FIG. 2 is a circuit diagram of a drive circuit that drives pixels of the liquid crystal display device according to the first embodiment.

FIG. 2 is a circuit diagram of a drive circuit that drives pixels of the liquid crystal display device according to the first embodiment. Formed in the display area 21 are wirings such as the data lines $25_n, 25_{n+1}$, and $25_{n+2}$ for supplying a pixel signal as display data to thin film transistor (TFT) elements Tr of the pixels Vpix and the scan lines $24_m, 24_{m+1}$, and $24_{m+2}$ for driving the TFT elements Tr. In this way, the data lines $25_n, 25_{n+1}$, and $25_{n+2}$ are extended along a plane parallel to the surface of the glass substrate 11, to supply the pixel signal for displaying an image to the pixels Vpix. Each pixel Vpix includes the TFT element Tr and a liquid crystal element LC. The TFT element Tr includes a thin film transistor, which is an n-channel metal oxide semiconductor (MOS) TFT in this example. One end of a source or a drain of the TFT element Tr is coupled to one of the data lines $25_n, 25_{n+1}$, and $25_{n+2}$, a gate thereof is coupled to one of the scan lines $24_m, 24_{m+1}$, and $24_{m+2}$, and the other end of the source or the drain is coupled to one end of the liquid crystal element LC. The liquid crystal element LC is coupled at one end to the other end of the source or the drain of the TFT element Tr, and is coupled at the other end to the common electrode COM.

The pixel Vpix is coupled to the other pixels Vpix belonging to the same row of the display area 21 through one of the scan lines $24_m, 24_{m+1}$, and $24_{m+2}$. The scan lines $24_m, 24_{m+1}$, and $24_{m+2}$ are coupled to the vertical driver 22 and are supplied with a vertical scan pulse of a scan signal from the vertical driver 22. The pixel Vpix is also coupled to the other pixels Vpix belonging to the same column of the display area 21 through one of the data lines $25_n, 25_{n+1}$, and $25_{n+2}$. The data lines $25_n, 25_{n+1}$, and $25_{n+2}$ are coupled to the horizontal driver 23 and are supplied with a pixel signal from the horizontal driver 23. Furthermore, the pixel Vpix is coupled to the other pixels Vpix belonging to the same column of the display area 21 through the common electrode COM. The common electrode COM is coupled to the driver IC 3 and is supplied with a drive signal from the driver IC 3.

The vertical driver 22 illustrated in FIG. 1 applies a vertical scan pulse to the gates of the TFT elements Tr of the pixels Vpix through the scan lines $24_m, 24_{m+1}$, and $24_{m+2}$ illustrated in FIG. 2 to thereby sequentially select one row (one horizontal line), as a target to be driven for display, from among the pixels Vpix formed in the matrix in the display area 21. The horizontal driver 23 illustrated in FIG. 1 supplies the pixel signal to each of the pixels Vpix included in one horizontal line sequentially selected by the vertical driver 22 through the respective data lines $25_n, 25_{n+1}$, and $25_{n+2}$ illustrated in FIG. 2. The pixels Vpix perform display of one horizontal line according to the supplied pixel signal. The driver IC 3 applies a drive signal so as to drive the common electrode COM.

As explained above, the liquid crystal display device 1 drives the vertical driver 22 so as to sequentially scan the scan lines $24_m, 24_{m+1}$, and $24_{m+2}$ to thereby sequentially select one horizontal line. In the liquid crystal display device 1, the horizontal driver 23 supplies a pixel signal to the pixels Vpix belonging to the one horizontal line, to thereby perform display of the horizontal line one line by one line. Upon the display operation, the driver IC 3 applies the drive signal to the common electrode COM.

The display area 21 has color filters. The color filter has a lattice-shaped black matrix 76a and openings 76b. The black matrix 76a is formed so as to cover the outer periphery of each pixel Vpix as illustrated in FIG. 2. That is, the black matrix 76a is arranged on boundaries each between two-dimensionally arranged pixel Vpix and pixel Vpix, and a lattice shape is thereby formed. The black matrix 76a is formed of a material having a high light absorptivity. The openings 76b are formed by the lattice shape of the black matrix 76a and are arranged corresponding to respective pixels Vpix.

The openings 76b include color areas colored in three colors of, for example, red (R), green (G), and blue (B). The color filter is structured to periodically array the color areas colored in the three colors, for example, red (R), green (G), and blue (B) in the openings 76b, and to associate the three color areas of R, G, and B, which are made a set, with the pixels Vpix illustrated in FIG. 2, which are grouped as a pixel Pix.

The color filters may be a combination of other colors if the color areas are colored in different colors. In the color filters, the luminance of the color area of green (G) is generally higher than the luminance of the color area of red (R) and of the color area of blue (B). However, the color filters are not needed and the color area is white in this case. Alternatively, light transmissive resin may be used for a color filter, so that the color area may also be made white.

In the display area 21, the scan lines 24 and the data lines 25 are arranged in an area where they overlap the black matrix 76a of the color filters when viewed from a direction perpendicular to the front. In other words, the scan lines 24 and the data lines 25 are behind the black matrix 76a when viewed from the direction perpendicular to the front. In the display area 21, the openings 76b are areas where the black matrix 76a is not arranged.

As illustrated in FIG. 2, the scan lines $24_m$, $24_{m+1}$, and $24_{m+2}$ are arranged at equal distances, and the data lines $25_n$, $25_{n+1}$, and $25_{n+2}$ are also arranged at equal distances. The pixels Vpix are arranged in areas partitioned by the adjacent scan lines $24_m$, $24_{m+1}$, and $24_{m+2}$ and the adjacent data lines $25_n$, $25_{n+1}$, and $25_{n+2}$ in the same orientation.

Figure 3A:
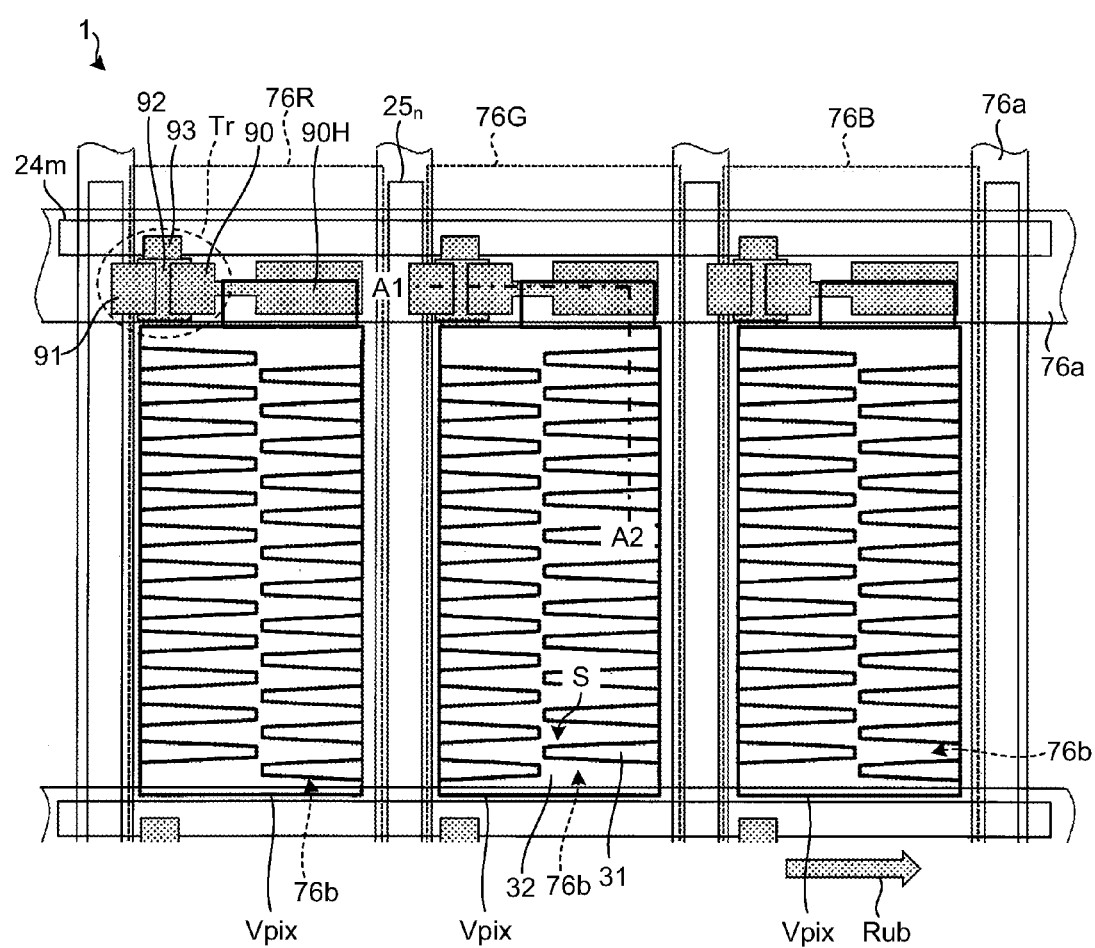
FIG. 3A and FIG. 3B are plan views for explaining the pixels of the liquid crystal display device according to the first embodiment.
Figure 3B:
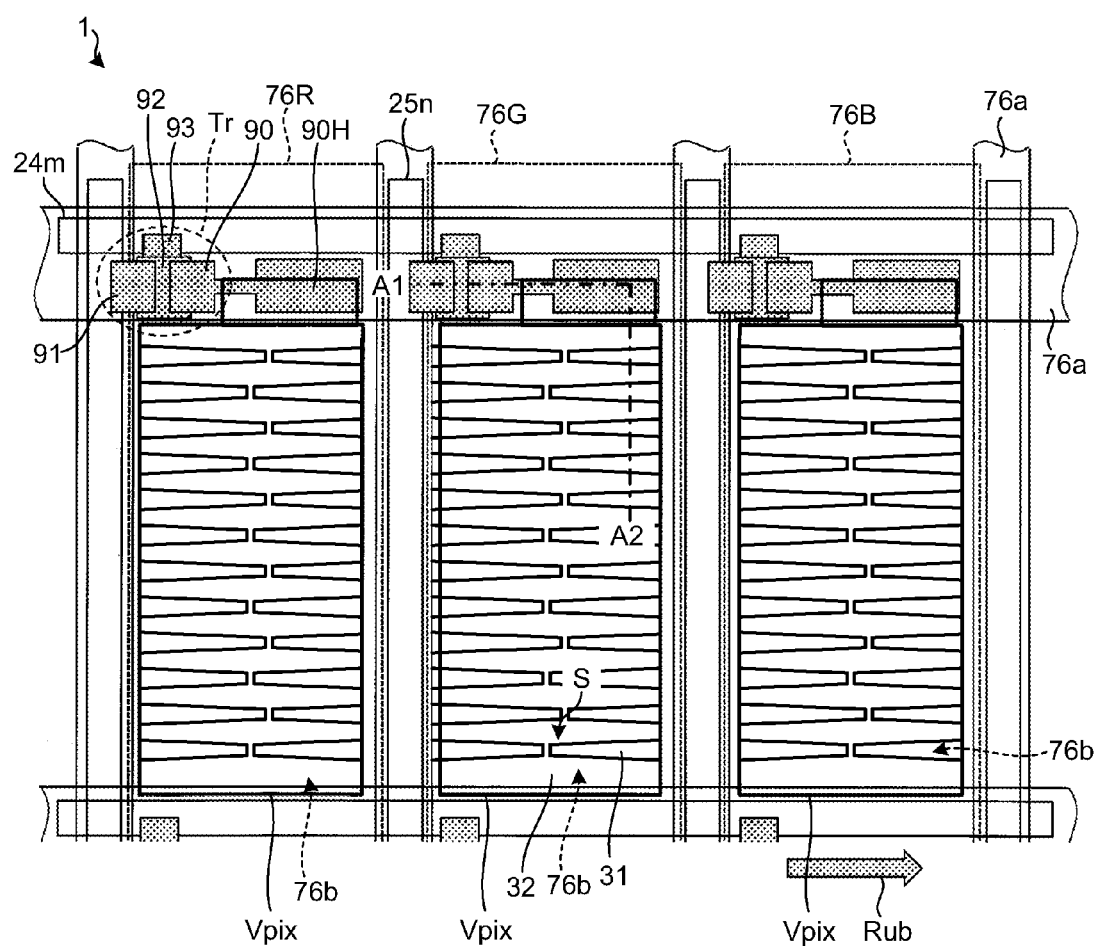

FIG. 3A and FIG. 3B are plan views for explaining the pixels of the liquid crystal display device according to the first embodiment. Each of the pixels Vpix includes: the opening 76b formed in a lower part of the pixel in a vertical scanning direction (lower side in the figure); the TFT element Tr arranged in an upper left side of the pixel in the vertical scanning direction (upper side in the figure); and a contact 90H, through which the pixel electrode is coupled to a drain electrode of the TFT element Tr, formed in an upper right side of the pixel in the vertical scanning direction (upper side in the figure). The drain of the TFT element Tr mentioned here includes part of a semiconductor layer (active layer) and a drain electrode 90. Likewise, the source of the TFT element Tr mentioned here includes other part of the semiconductor layer (active layer) and a source electrode 91. As for color filters 76R, 76G, and 76B, color areas of the color filters colored in the three colors of, for example, red (R), green (G), and blue (B) are periodically arranged in the openings 76b to form the color areas of the three colors of R, G, and B in pixels Vpix illustrated in FIG. 2.

Figure 4:
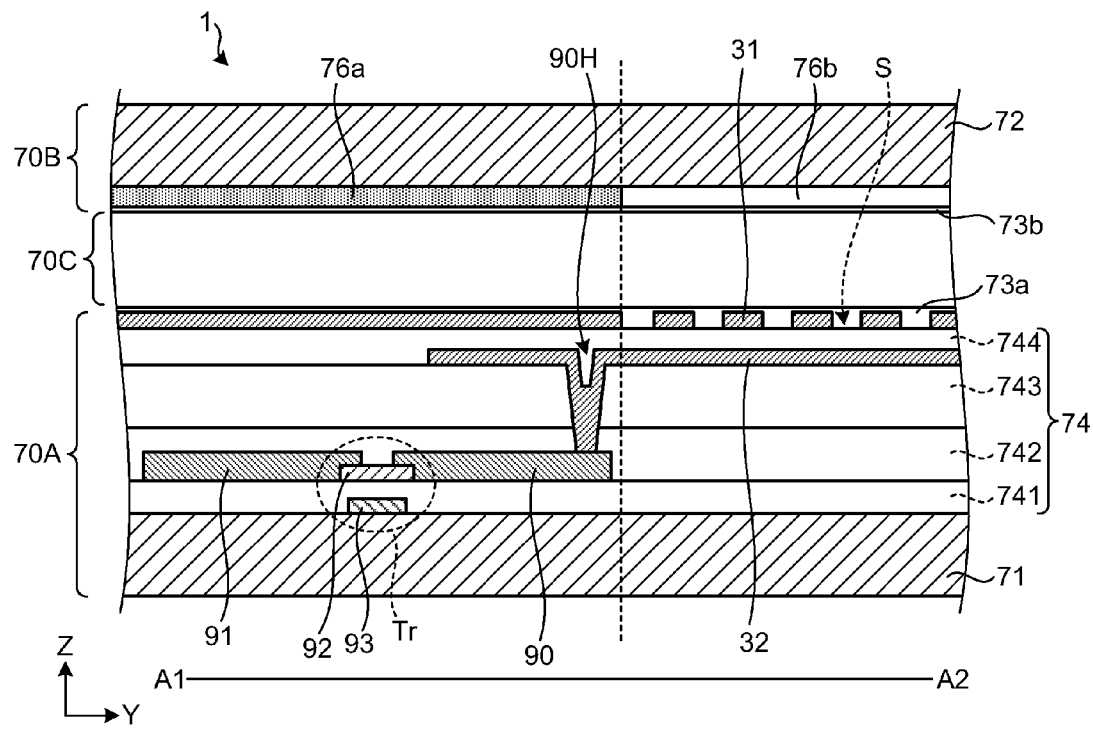
FIG. 4 is a schematic diagram of a cross section of line A1-A2 in FIG. 3A and FIG. 3B.

FIG. 4 is a schematic diagram of a cross section of line A1-A2 in FIG. 3A and FIG. 3B. The liquid crystal display device 1 includes, as illustrated in FIG. 4, a pixel substrate (first substrate) 70A, a counter substrate (second substrate) 70B oppositely arranged in a direction vertical to the surface of the pixel substrate 70A, and a liquid crystal layer 70C interposed between the pixel substrate 70A and the counter substrate 70B. A backlight (not illustrated) is arranged on the face of the pixel substrate 70A on the opposite side to the liquid crystal layer 70C. The photo spacers (not illustrated) keep a gap between the pixel substrate 70A and the counter substrate 70B at a predetermined gap.

In the liquid crystal layer 70C, an electric field (horizontal electric field) is generated in a direction parallel to the TFT substrate 71 between a first electrode 31 and a second electrode 32 provided on the liquid crystal layer 70C side of a TFT substrate 71 in the pixel substrate 70A, to thereby rotate liquid crystal molecules of the liquid crystal layer 70C in plane parallel to the substrate surface, and a change in the light transmittance corresponding to the rotation of the liquid crystal molecules is used to perform display. The liquid crystal layer 70C according to the first embodiment is driven in the FFS mode in which the electric field (horizontal electric field) is formed in the direction parallel to the TFT substrate 71 between the first electrode 31 and the second electrode 32 layered in the direction (Z direction) vertical to the surface of the TFT substrate 71 of the pixel substrate 70A to thereby rotate liquid crystal molecules of the liquid crystal layer 70C in plane parallel to the substrate surface and the change in the light transmittance corresponding to the rotation of the liquid crystal molecules is used to perform display. For example, the second electrode 32 illustrated in FIG. 4 is the pixel electrode and the first electrode 31 is the common electrode COM. A first orientation film 73a and a second orientation film 73b are arranged between the liquid crystal layer 70C and the pixel substrate 70A and between the liquid crystal layer 70C and the counter substrate 70B respectively illustrated in FIG. 4.

The counter substrate 70B includes a glass substrate 72 and the black matrix 76a of a shading type formed on one face of the glass substrate 72. The black matrix 76a faces the liquid crystal layer 70C in the direction vertical to the pixel substrate 70A.

The pixel substrate 70A includes the TFT substrate 71 as a circuit board. The scan line $24_m$ illustrated in FIG. 3A and FIG. 3B is formed above the TFT substrate 71. A gate electrode 93 is electrically coupled to the scan line $24_m$. Further, in FIGS. 3 and 4, the scan line $24_m$ and the gate electrode 93 are formed in different layers. However, both the scan line $24_m$ and the gate electrode 93 can be integrally formed.

The semiconductor layer 92 including amorphous silicon (a-Si) being an active layer of the TFT element Tr is formed above the gate electrode 93. The semiconductor layer 92 is coupled to the source electrode 91 constituting the TFT element Tr. The source electrode 91 is a conductive material and is electrically coupled to part of the semiconductor layer 92. The source electrode 91 is electrically coupled to the data line $25_n$ illustrated in FIG. 3A and FIG. 3B. (The data line $25_n$ is not illustrated in FIG. 4.) The semiconductor layer 92 is coupled to the drain electrode 90 constituting the TFT element Tr. The drain electrode 90 is electrically coupled to other part of the semiconductor layer 92. Further, in FIG. 3A and FIG. 3B, the data line $25_n$ and the source electrode 91 are formed in different layers. However, both the data line $25_n$ and the source electrode 91 can be integrally formed.

An insulating layer 74 has, for example, an insulating film 741 between the scan line $24_m$ and the semiconductor layer 92, an insulating film 742 between the semiconductor layer 92 and the data line $25_n$, an insulating film 743 between the data line $25_n$ and the second electrode 32, and an insulating film 744 between the second electrode 32 and the first electrode 31, which are layered in this order. The insulating film 741, the insulating film 742, the insulating film 743, and the insulating film 744 may be the same insulating material as one another, or some of them may be a different material. For example, the insulating film 743 is formed of an organic-based insulating material such as polyimide resin, and the other insulating films (the insulating film 741, the insulating film 742, and the insulating film 744) are formed of an inorganic-based insulating material such as silicon nitride and silicon oxide.

The contact 90H formed of conductive metal is formed in a so-called contact hall to couple the drain electrode 90 and the second electrode 32. The first electrode 31 being the common electrode COM is supplied with the common potential VCOM to be commonly given to the pixels. The first electrode 31 and the second electrode 32 are translucent electrodes each formed of a translucent conductive material (translucent conductive oxide) such as indium tin oxide (ITO).

Figure 5:
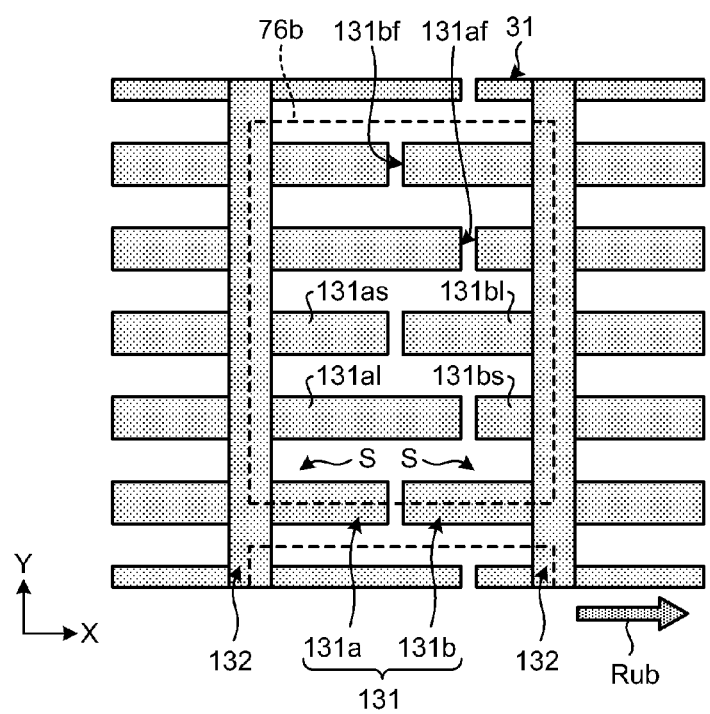
FIG. 5 is a schematic diagram for explaining a relation between a shape of a first electrode and an opening according to the first embodiment.

FIG. 5 is a schematic diagram for explaining a relation between a shape of the first electrode and an opening according to the first embodiment. As illustrated in FIG. 5, the first electrode 31 is formed into a comb-shape by slits S each of which is an area without the conductive material. The first electrode 31 has a plurality of comb-shaped portions 131 protruding from electrode base portions 132 that extend in a Y direction. Each of the comb-shaped portions 131 includes a first comb-shaped portion 131a and a second comb-shaped portion 131b which protrude from the adjacent electrode base portions 132 in opposite directions to each other. A plurality of first comb-shaped portions 131a protrude from each of the electrode base portions 132 at a fixed distance away from each other. Likewise, a plurality of second comb-shaped portions 131b protrude from each of the electrode base portions 132 at a fixed distance away from each other. From each of the electrode base portions 132, the first comb-shaped portions 131a extend along an X direction and the second comb-shaped portions 131b extend along the X direction but in the opposite direction to the extending direction of the first comb-shaped portions 131a. A front edge 131af of the first comb-shaped portions 131a extending from one of the adjacent electrode base portions 132 and a front edge 131bf of the second comb-shaped portions 131b extending from the other electrode base portion 132 face each other so as not to contact each other. The electrode base portions 132 are formed of a translucent conductive material (translucent conductive oxide) such as ITO as well as the first comb-shaped portion 131a and the second comb-shaped portion 131b.

The first comb-shaped portions 131a include a first comb-shaped portion 131a1 with a long length from the electrode base portion 132 to the front edge 131af and a first comb-shaped portion 131as with a short length from the electrode base portion 132 to the front edge 131af, which alternately protrude from the electrode base portion 132 at a fixed distance away from each other. The second comb-shaped portions 131b includes a second comb-shaped portion 131b1 with a long length from the electrode base portion 132 to the front edge 131bf and a second comb-shaped portion 131bs with a short length from the electrode base portion 132 to the front edge 131bf, which alternately protrude from the electrode base portion 132 at a fixed distance away from each other.

Figure 6:
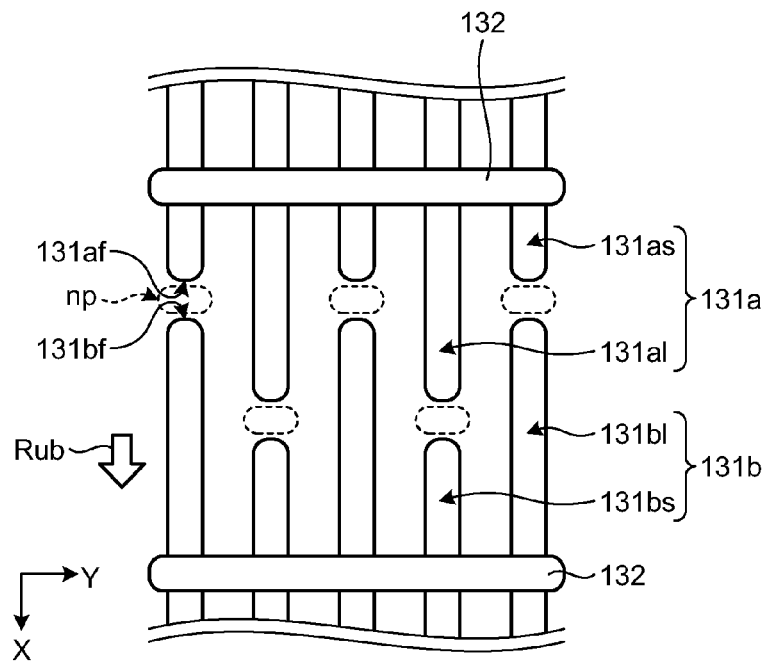
FIG. 6 is a schematic diagram for explaining a transmission ineffective area according to the first embodiment.

FIG. 6 is a schematic diagram for explaining a transmission ineffective area according to the first embodiment. Between the adjacent electrode base portions 132, the first comb-shaped portion 131a1 and the second comb-shaped portion 131bs face each other with interposition of a transmission ineffective area np where the translucent conductive material is not provided. Moreover, between the adjacent electrode base portions 132, the first comb-shaped portion 131as and the second comb-shaped portion 131b1 face each other with interposition of the transmission ineffective area np where the translucent conductive material is not provided.

Figure 7:
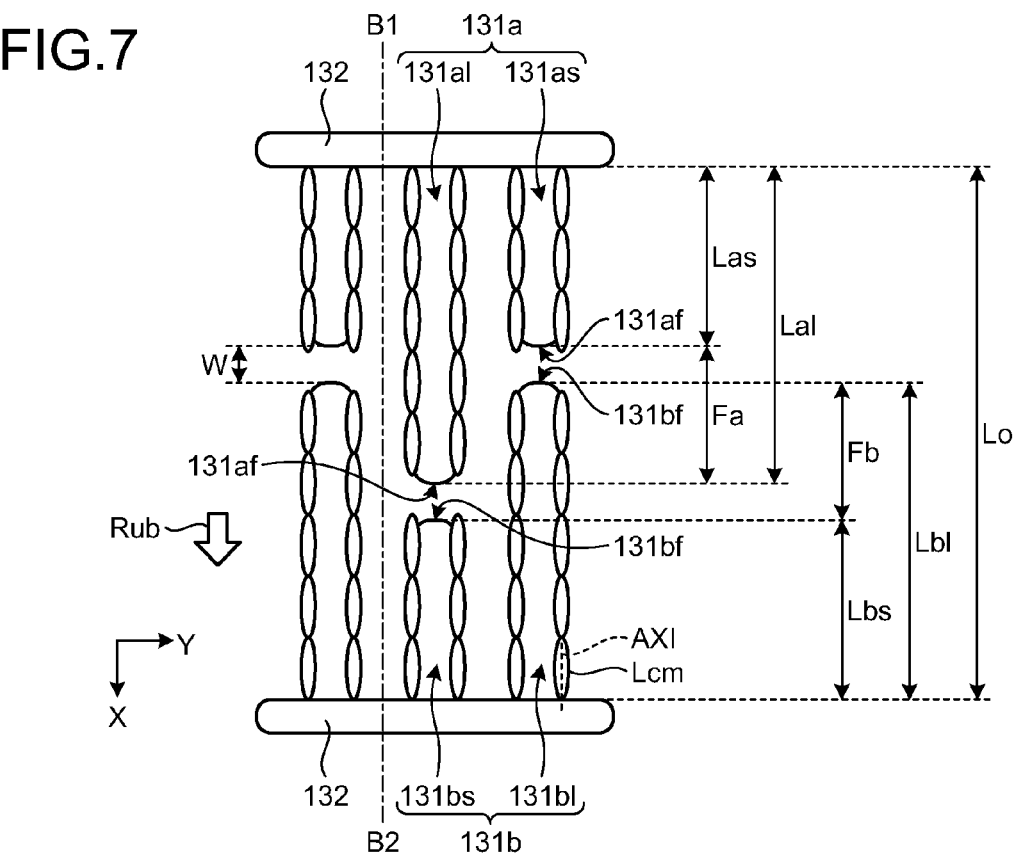
FIG. 7 is an explanatory diagram for explaining orientation of the liquid crystal when a voltage for forming an electric field is not applied between the first electrode and the second electrode in the liquid crystal display device according to the first embodiment.

FIG. 7 is an explanatory diagram for explaining orientation of the liquid crystal when a voltage for forming an electric field is not applied between the first electrode and the second electrode in the liquid crystal display device according to the first embodiment. For example, as illustrated in FIG. 7, a total slit length between the electrode base portions 132 in the X direction is set as Lo. A comb protruded length of the first comb-shaped portion 131 as in the X direction is set as Las. A comb protruded length of the first comb-shaped portion 131a1 in the X direction is set as Lal. A difference in length between the front edge 131af of the first comb-shaped portion 131 as and the front edge 131af of the first comb-shaped portion 131a1 is a length Fa.

A gap of the transmission ineffective area np illustrated in FIG. 6, i.e., a distance W between the front edge 131af of the first comb-shaped portion 131 as and the front edge 131bf of the second comb-shaped portion 131b1 is the same as a gap between the front edge 131af of the first comb-shaped portion 131a1 and the front edge 131bf of the second comb-shaped portion 131bs.

Likewise, a comb protruded length of the second comb-shaped portion 131bs in the X direction illustrated in FIG. 7 is set as Lbs. A comb protruded length of the second comb-shaped portion 131b1 in the X direction is set as Lbl. A difference in length between the front edge 131bf of the second comb-shaped portion 131bs and the front edge 131bf of the second comb-shaped portion 131b1 is a length Fb.

The first orientation film 73a is subjected to a rubbing process in a rubbing direction Rub (first rubbing direction) illustrated in FIG. 3A, FIG. 3B, and FIG. 5 so as to have predetermined initial orientation characteristics in the X direction. The second orientation film 73b is subjected to a rubbing process in an antiparallel direction (second rubbing direction) to the rubbing direction Rub of the first orientation film 73a. The rubbing directions of the first orientation film 73a and the second orientation film 73b are antiparallel to each other. As explained above, the first comb-shaped portion 131a extends along the X direction, and the second comb-shaped portion 131b extends along the X direction in the opposite direction to the extending direction of the first comb-shaped portion 131a. Accordingly, the rubbing direction Rub is parallel to the extending directions of the first comb-shaped portion 131a and the second comb-shaped portion 131b. The "parallel" mentioned here has only to be parallel to such an extent that a rotation direction LCQ of liquid crystal molecules Lcm illustrated in FIG. 9, explained later, can be maintained. More specifically, the extent includes a manufacturing error which is 0 degrees to 0.5 degrees. In the present embodiment, the first orientation film 73a and the second orientation film 73b so as to have the predetermined initial orientation characteristics are subjected to a rubbing process. However, it is not limited for the first orientation film 73a and the second orientation film 73b to have the predetermined initial orientation characteristics. Instead of the rubbing process, the first orientation film 73a and the second orientation film 73b can be formed of materials with photo-orientation characteristics to have the predetermined initial orientation characteristics.

Figure 8:
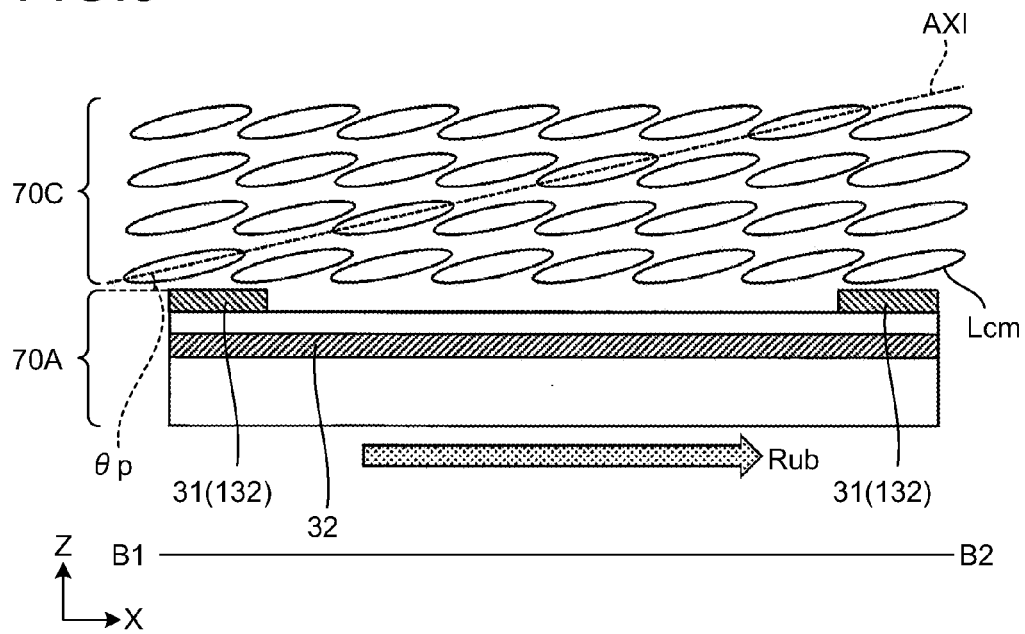
FIG. 8 is a schematic diagram of a cross section of line B1-B2 in FIG. 7.
Figure 9:
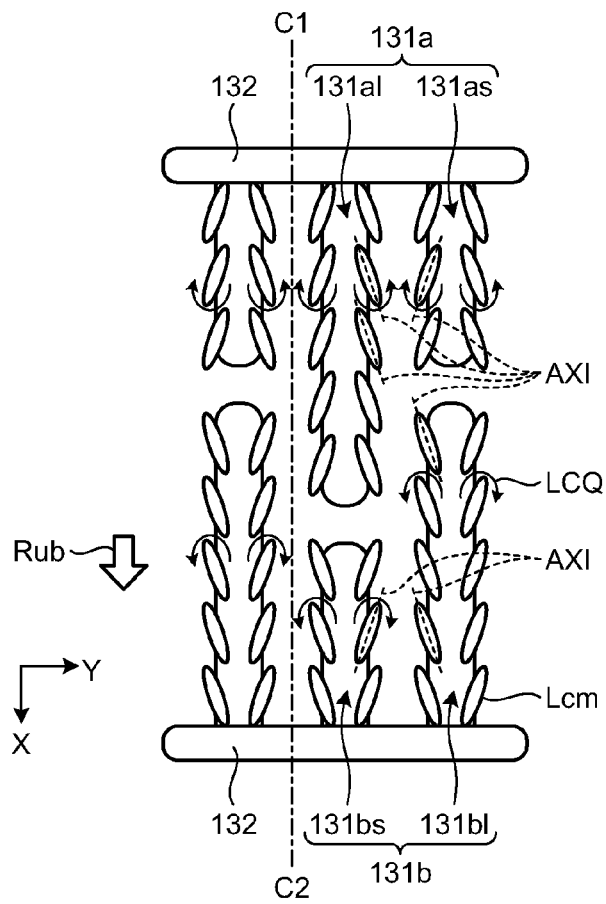
FIG. 9 is an explanatory diagram for explaining orientation of the liquid crystal when a voltage for forming an electric field is applied between the first electrode and the second electrode in the liquid crystal display device according to the first embodiment.
Figure 10:
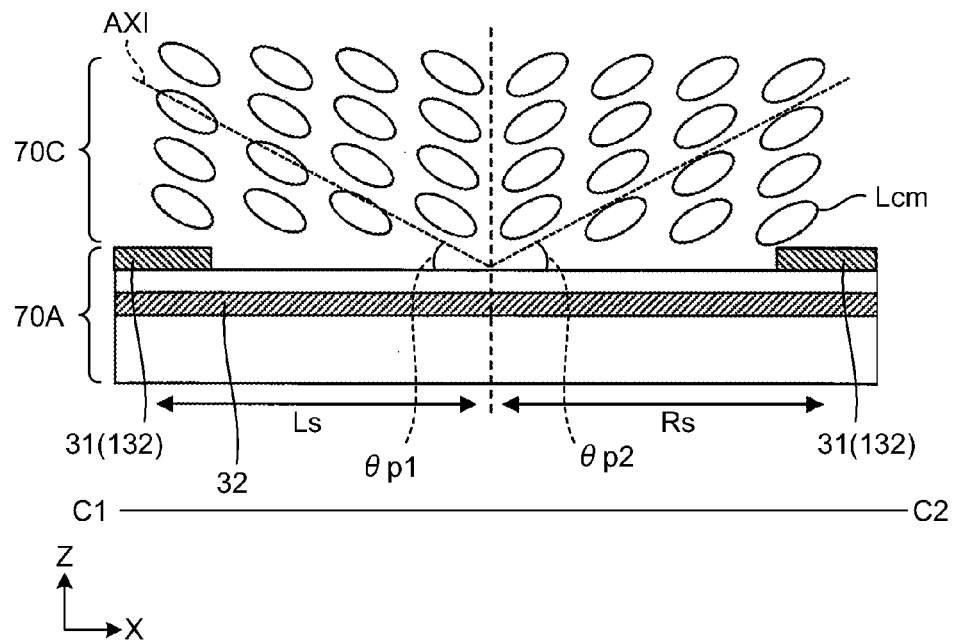
FIG. 10 is a schematic diagram of a cross section of line C1-C2 in FIG. 9.

FIG. 8 is a schematic diagram of a cross section of line B1-B2 in FIG. 7. FIG. 9 is an explanatory diagram for explaining orientation of the liquid crystal when a voltage for forming an electric field is applied between the first electrode and the second electrode in the liquid crystal display device according to the first embodiment. FIG. 10 is a schematic diagram of a cross section of line C1-C2 in FIG. 9.

As explained above, the first orientation film 73a is subjected to the rubbing process in the rubbing direction Rub illustrated in FIG. 3A, FIG. 3B, FIG. 5, and FIG. 7 so as to have predetermined initial orientation characteristics in the X direction. Therefore, as illustrated in FIG. 7, when a voltage for forming an electric field is not applied between the first electrode 31 and the second electrode 32, long-axis directions AXI of the liquid crystal molecules Lcm in the liquid crystal layer 70C are likely to be aligned in parallel to the extending direction of the first comb-shaped portion 131a and the second comb-shaped portion 131b. Therefore, the liquid crystal molecules Lcm are initially oriented along a direction parallel to the extending direction of the first comb-shaped portion 131a and the second comb-shaped portion 131b in an area near the right long side and an area near the left long side of each of the first comb-shaped portions 131a and the second comb-shaped portions 131b, which face each other in a width direction of the slit S. Moreover, the liquid crystal molecules Lcm illustrated in FIG. 8 are aligned along the rubbing direction Rub and are initially oriented upward toward the rubbing direction Rub so as to have a pre-tilt angle $\theta p$ with respect to the surface of the TFT substrate 71.

As illustrated in FIG. 9, when a voltage for forming an electric field is applied between the first electrode 31 and the second electrode 32, the liquid crystal molecules Lcm are rotated in a liquid crystal rotation direction LCQ. In other words, the liquid crystal rotation direction LCQ indicates a direction of twisting or of rotating the liquid crystal on an X-Y plane. The liquid crystal molecules Lcm in an area near the right long side of the first comb-shaped portion 131a1 and in an area near the left long side of the first comb-shaped portion 131a1 undergo electric fields opposite to each other to be easily rotated in opposite directions. The liquid crystal molecules Lcm in an area near the right long side of the first comb-shaped portion 131 as and in an area near the left long side of the first comb-shaped portion 131 as undergo electric fields opposite to each other to be easily rotated in opposite directions. Likewise, the liquid crystal molecules Lcm in an area near the right long side of the second comb-shaped portion 131b1 and in an area near the left long side of the second comb-shaped portion 131b1 undergo electric fields opposite to each other to be easily rotated in opposite directions. The liquid crystal molecules Lcm in an area near the right long side of the second comb-shaped portion 131bs and in an area near the left long side of the second comb-shaped portion 131bs undergo electric fields opposite to each other to be easily rotated in opposite directions.

As described above, in the liquid crystal layer 70C of the liquid crystal display device 1 according to the first embodiment, a long side of the first comb-shaped portion 131a1 and a long side of the first comb-shaped portion 131 as are arranged adjacent to each other in the width direction of the slit S, and a long side of the second comb-shaped portion 131b1 and a long side of the second comb-shaped portion 131bs are arranged adjacent to each other in the width direction of the slit S. When a voltage is applied between the first electrode 31 and the second electrode 32, the liquid crystal molecules are rotated in opposite directions to each other in the area near the right long side being one of the adjacent long sides and in the area near the left long side being the other thereof. Therefore, in the liquid crystal display device 1 according to the first embodiment, as compared with the display device in the FFS mode described in JP-A-2008-52161, the liquid crystal molecules Lcm react more quickly to the change in the electric field between the first electrode 31 and the second electrode 32. Accordingly, the liquid crystal display device 1 according to the first embodiment is thereby improved in its response speed. Moreover, as illustrated in FIG. 9, part of a long side of the first comb-shaped portion 131a1 and part of a long side of the second comb-shaped portion 131b1 are arranged adjacent to each other in the width direction of the slit S. The liquid crystal molecules Lcm in the areas respectively near the adjacent long sides of the first comb-shaped portion 131a1 and the second comb-shaped portion 131b1 are inclined to the same direction respectively with respect to the X direction.

The response speed is a speed at which a transmittance of the liquid crystal is shifted between predetermined levels when a voltage is applied to the first electrode 31 and the second electrode 32. In other words, the response speed is defined by a time required for transition from the state in which the voltage is not applied (e.g., transmittance=0) to the state in which the voltage is applied (transmittance=1) or required for its reverse transition.

When a voltage for forming an electric field is applied between the first electrode 31 and the second electrode 32, the long-axis direction AXI of the liquid crystal molecules Lcm also change in the Z direction, as illustrated in FIG. 10, while rotating within a plane (X-Y plane) parallel to the surface of the pixel substrate 70A (TFT substrate 71). The first electrode 31 and the second electrode 32 are arranged to face each other in a direction perpendicular to the surface of the pixel substrate 70A (TFT substrate 71), and therefore the electric field formed between the first electrode 31 and the second electrode 32 becomes a fringe electric field that passes through the slit S. The fringe electric field causes the long axes of the liquid crystal molecules Lcm to rise toward a direction perpendicular (Z direction) to the surface of the surface of the pixel substrate 70A (TFT substrate 71) while rotating in liquid crystal rotation directions LCQ (clockwise rotation or counterclockwise rotation) on the X-Y plane illustrated in FIG. 9.

As illustrated in FIG. 10, the long-axis direction AXI of the liquid crystal molecules Lcm forms an angle $\theta p2$ larger than the pre-tilt angle $\theta p$ in a slit area Rs between the second comb-shaped portions 131b. In a slit area Ls between the first comb-shaped portions 131a, the long-axis direction AXI of the liquid crystal molecules Lcm forms an angle $\theta p1$ in an opposite direction to the pre-tilt angle $\theta p$. The long-axis direction AXI of the liquid crystal molecules Lcm in the slit area Ls is harder to rise than the long-axis direction AXI of the liquid crystal molecules Lcm in the slit area Rs, and responsiveness is possibly inferior.

As explained above, the long-axis direction AXI of the liquid crystal molecules Lcm in the slit area Ls illustrated in FIG. 10 is harder to rise than the long-axis direction AXI of the liquid crystal molecules Lcm in the slit area Rs, and responsiveness is possibly inferior. To make the slit area Ls smaller than the slit area Rs, the comb protruded length Lal illustrated in FIG. 7 is made smaller than the comb protruded length Lbl of the second comb-shaped portion 131b1 located on the downstream side in the rubbing direction Rub than the first comb-shaped portion 131a1. This enables the liquid crystal display device 1 according to the first embodiment to enhance the response speed.

Figure 11:
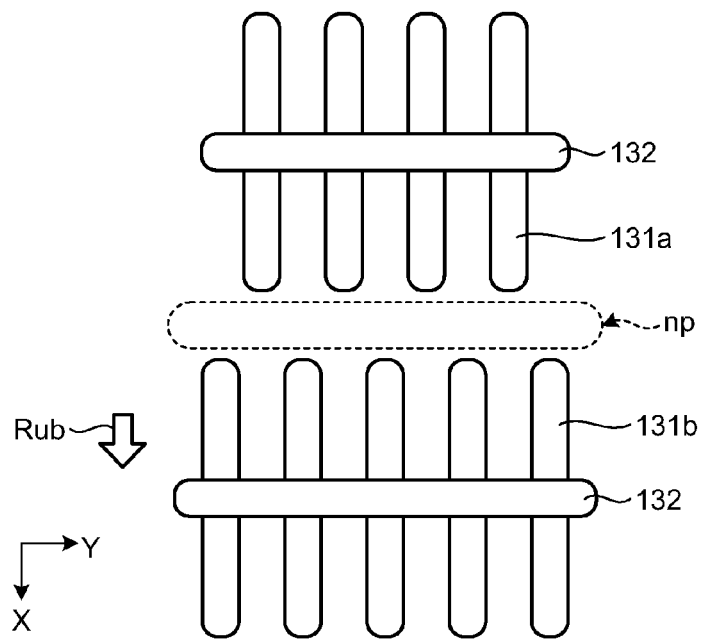
FIG. 11 is a schematic diagram for explaining a shape of a first electrode according to a comparative example in detail.
Figure 12:
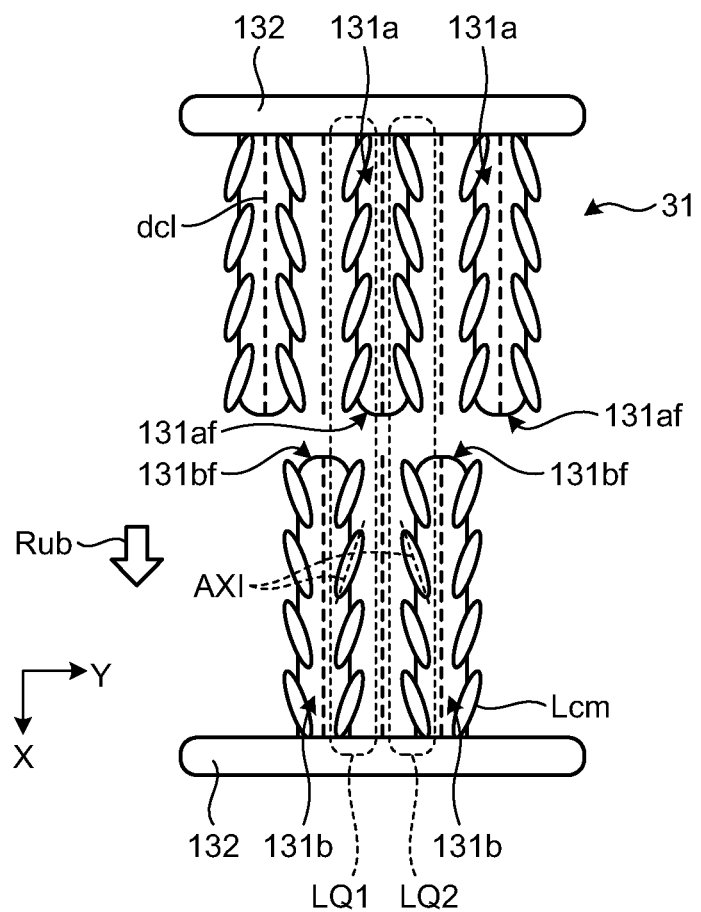
FIG. 12 is a schematic diagram of disclination lines of the first electrode according to the comparative example.

FIG. 11 is a schematic diagram for explaining a shape of a first electrode according to a comparative example in detail. FIG. 12 is a schematic diagram of disclination lines of the first electrode according to the comparative example. With this structure, the first comb-shaped portions 131a and the second comb-shaped portions 131b face each other with interposition of the transmission ineffective area np where the translucent conductive material is not provided. Therefore, the transmission ineffective areas np where the liquid crystal molecules are difficult to move even when the voltage is applied to the first electrode 31 are connected to each other, thus being easy to see. As a result, the transmission ineffective area np looks as if it is widened due to influence of overlap of diffracted lights, and the transmittance may degrade.

In the first electrode 31 according to the first embodiment, the first comb-shaped portions 131a1 and the first comb-shaped portions 131 as alternately protrude from the electrode base portion 132 at a fixed distance away from each other. Therefore, there is the first comb-shaped portion 131a1 between the transmission ineffective areas np, and the transmission ineffective areas np are not continuously lined in a row along the Y direction. For example, the distance W of the transmission ineffective area np illustrated in FIG. 7 is made smaller than a length obtained by multiplying the length Fa by (½). With this structure, the first comb-shaped portion 131a1 (or the second comb-shaped portions 131b1) is interposed between the adjacent transmission ineffective areas np, and therefore the transmission ineffective areas np sandwich are not continuously aligned on a straight line in the Y direction. This allows the influence of the overlap of the diffracted lights to be decreased, thus reducing the possibility of widening the transmission ineffective area np.

As illustrated in FIG. 12, a disclination line dcl along which liquid crystal molecules are difficult to move even when the voltage is applied to the first electrode 31 is easy to occur at the center of the first comb-shaped portion 131a, at the center of the second comb-shaped portion 131b, at the center between adjacent first comb-shaped portions 131a, and at the center between adjacent second comb-shaped portions 131b. As illustrated in FIG. 11 and FIG. 12, in the first electrode 31 according to the comparative example, the front edge 131af of the first comb-shaped portion 131a and the front edge 131bf of the second comb-shaped portion 131b are alternately arranged in the Y direction. Therefore, the orientations of the liquid crystal molecules Lcm are the same as each other in a line LQ1. The orientations of the liquid crystal molecules Lcm are also the same as each other in a line LQ2. As a result, the disclination line dcl occurring at the center of the first comb-shaped portion 131a and the disclination line dcl occurring between the adjacent second comb-shaped portions 131b are connected to each other, thus being easy to see. In addition, the disclination line dcl occurring at the center of the second comb-shaped portions 131b and the disclination line dcl occurring between the adjacent first comb-shaped portions 131a are connected to each other, thus being easy to see. In this way, the first electrode 31 illustrated in FIG. 12 has many disclination lines dcl, which causes the transmittance to degrade.

Figure 13:
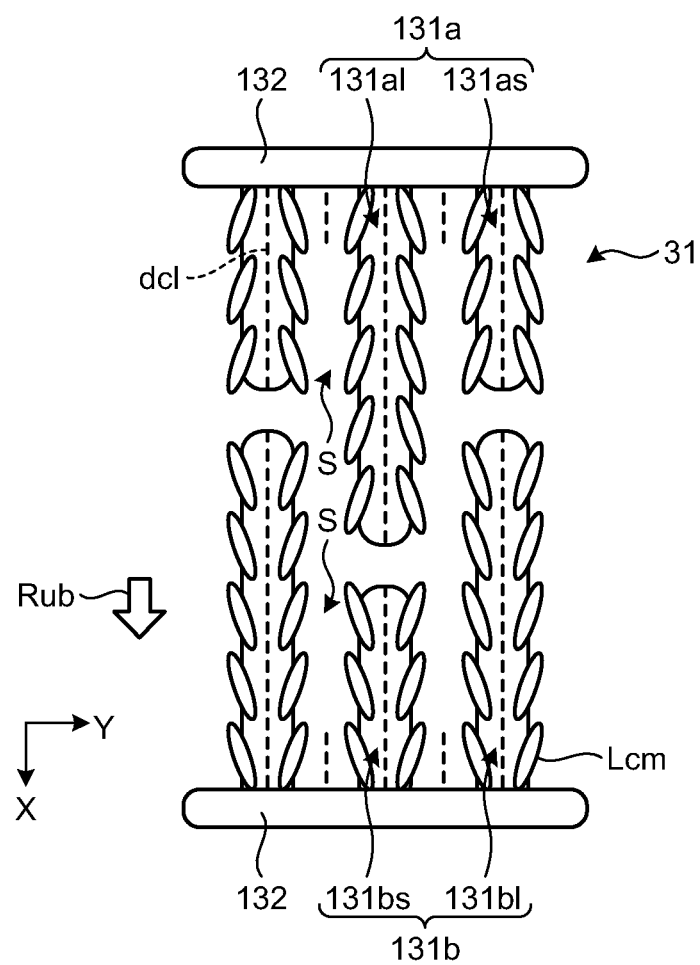
FIG. 13 is a schematic diagram of disclination lines of the first electrode according to the first embodiment.

FIG. 13 is a schematic diagram of disclination lines of the first electrode according to the first embodiment. As illustrated in FIG. 13, in a region where the first comb-shaped portion 131a1 and the first comb-shaped portion 131 as are adjacent to each other in the width direction of the slit S, the liquid crystal molecules Lcm in the areas respectively near the adjacent long sides thereof are inclined in the opposite direction with respect to the X direction. In a region where the first comb-shaped portion 131a1 and the second comb-shaped portion 131b1 are adjacent to each other in the width direction of the slit S, the liquid crystal molecules Lcm in the areas respectively near the adjacent long sides thereof are inclined in the same direction with respect to the X direction. Moreover, in a region where the second comb-shaped portion 131b1 and the second comb-shaped portion 131bs are adjacent to each other in the width direction of the slit S, the liquid crystal molecules Lcm in the areas respectively near the adjacent long sides thereof are inclined in the opposite direction with respect to the X direction. As a result, when the areas respectively near the two right long sides aligned in the X direction and the areas respectively near the two left long sides aligned in the X direction are seen from a side of one of the adjacent electrode base portion 132 to the other, the liquid crystal molecules are aligned in the order of the opposite direction to each other, the same direction as each other, and the opposite direction to each other. Therefore, the disclination lines dcl are hard to be connected to each other, and the number of the disclination lines dcl of the first electrode 31 according to the first embodiment becomes less than that of the disclination lines dcl illustrated in FIG. 12. Thus the liquid crystal display device 1 according to the first embodiment is capable of improving the transmittance in addition to remarkable features such as a high-speed response and a wide visual field angle.

Manufacturing Method

A method of manufacturing the liquid crystal display device 1 according to the first embodiment includes, for example, the following processes. A manufacturing system processes a first substrate preparing step of preparing a glass substrate being a translucent substrate as the TFT substrate 71 of the pixel substrate (first substrate) 70A.

Subsequently, the manufacturing system forms the scan line 24m and the gate electrode 93 on the TFT substrate 71. The manufacturing system then forms the insulating film 741 to be located between the scan line 24m/the gate electrode 93 and the semiconductor layer 92 on the TFT substrate 71. Then the manufacturing system forms layers such as the source electrode 91, the drain electrode 90, and the semiconductor layer 92. The manufacturing system forms the insulating film 742 to be located between the semiconductor layer 92 and the data line 25n. The manufacturing system forms the data line 25n to couple the data line 25n and the source electrode 91. The manufacturing system then forms the insulating film 743 to be located between the data line 25n and the second electrode 32.

Subsequently, the manufacturing system forms the second electrode 32 being the pixel electrode by sputtering, etching, or so, and couples the drain electrode 90 to the second electrode 32 via the conductive contact 90H. The thickness of the second electrode 32 is, for example, 10 nm to 100 nm. The manufacturing system then forms the insulating film 744 on the second electrode 32 using a plasma chemical vacuum deposition (CVD) method or the like.

The manufacturing system forms the first electrode 31 being the common electrode COM by sputtering, etching, or so. The thickness of the first electrode 31 is, for example, 10 nm to 100 nm. The first electrode 31 is formed into a comb shape with the slits S. The manufacturing system forms the first orientation film 73a, on the first electrode 31, in which a polymeric material such as polyimide is subjected to a process in the rubbing direction Rub. In this manner, the manufacturing system processes a first substrate manufacturing step.

The manufacturing system processes a second substrate preparing step of preparing a glass substrate being a translucent substrate as the glass substrate 72 of the counter substrate (second substrate) 70B.

The manufacturing system forms the layer including the color filters 76R, 76G, and 76B, and the black matrix 76a on the glass substrate 72 and forms an overcoat layer or so on top of the layer. The manufacturing system forms the second orientation film 73b, on the overcoat layer, in which a polymeric material such as polyimide is subjected to a process in an antiparallel direction (opposite direction) to the rubbing direction Rub. In this manner, the manufacturing system processes a second substrate manufacturing step.

The manufacturing system causes the pixel substrate 70A and the counter substrate 70B to face each other, injects the liquid crystal into between the two, and seals the liquid crystal by using a frame part to form the liquid crystal layer 70C. A polarizer, a backlight, and the like are attached to the rear side of the pixel substrate 70A, and a polarizer and the like are attached to the front side thereof. The driver IC 3 is coupled to an electrode edge of the frame part, and the liquid crystal display device 1 is thereby manufactured.

In the first embodiment, the amorphous silicon (a-Si) is used as the semiconductor layer 92 forming the TFT element Tr; however, the embodiment is not limited thereto. Polysilicon (poly-Si) may be used as the semiconductor layer 92. In addition, other semiconductor materials (e.g., germanium (Ge)) may be used instead of silicon or any material obtained by adding other material to silicon (e.g., silicon germanium (SiGe)) may be used. Furthermore, an oxide semiconductor material may be used as the semiconductor layer 92. For example, an oxide semiconductor material including indium (In) may be used as the oxide semiconductor material.

In the first embodiment, the TFT element Tr is a bottom gate type TFT in which the gate electrode 93 is formed below the semiconductor layer. However, if possible, the TFT element Tr may use a structure of a top gate type TFT in which the gate electrode 93 is formed above the semiconductor layer.

1-2. Second Embodiment

Figure 14:
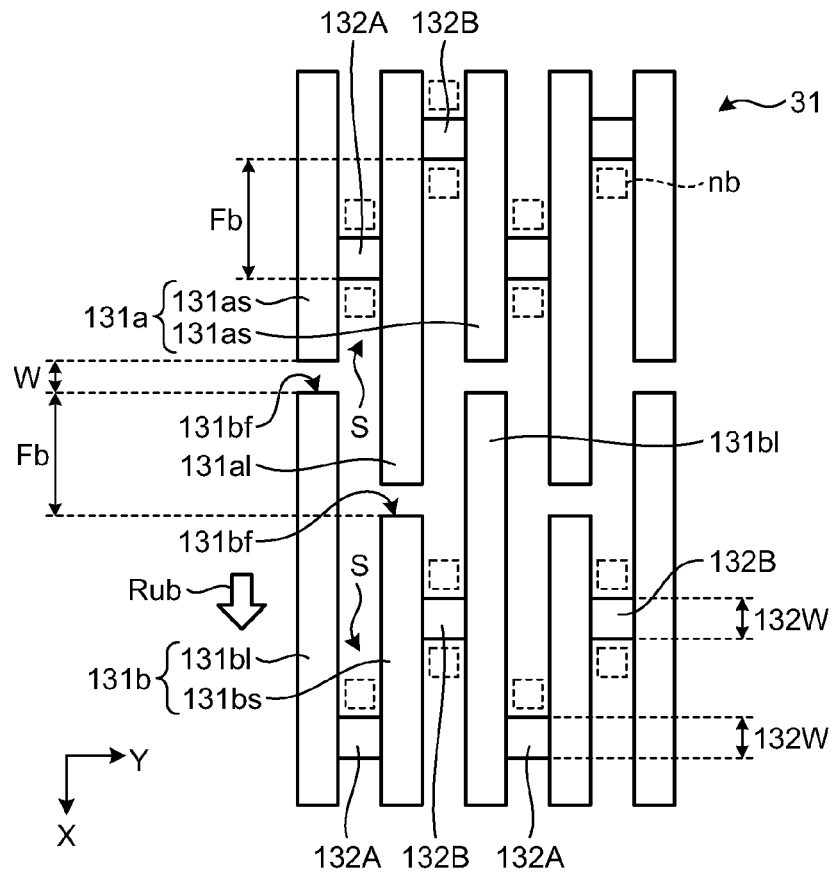
FIG. 14 is a schematic diagram for explaining a shape of a first electrode according to a second embodiment.

A liquid crystal display device 1 according to a second embodiment will be explained below. FIG. 14 is a schematic diagram for explaining a shape of a first electrode according to the second embodiment. The same letters or numerals are assigned to the same components as these explained in the first embodiment, and overlapping explanation is therefore not repeated.

Electrode base portions 132A and 132B according to the second embodiment have a staggered arrangement in which they extend in the Y direction and positions thereof in the X direction are different from each other. For example, when a difference in length between the front edge 131bf of the second comb-shaped portion 131bs and the front edge 131bf of the second comb-shaped portion 131b1 is the length Fb, the electrode base portions 132A and 132B are arranged in positions different from each other by the length Fb in the X direction.

An area near the electrode base portion 132A or 132B inside the slit S is likely to be the transmission ineffective area nb in which the liquid crystal molecules are hard to move even when the voltage is applied to the first electrode 31. The electrode base portions 132A and 132B according to the second embodiment have the staggered arrangement in which they extend in the Y direction and positions thereof in the X direction are different from each other. Therefore, the transmission ineffective areas nb are not lined in the Y direction, and the overlap of diffracted lights is thereby reduced. Because of this, the transmittance is improved in the liquid crystal display device 1. As a result, the liquid crystal display device 1 according to the second embodiment is capable of improving the transmittance in addition to the remarkable features such as a high-speed response and a wide visual field angle.

1-3. Third Embodiment

Figure 15:
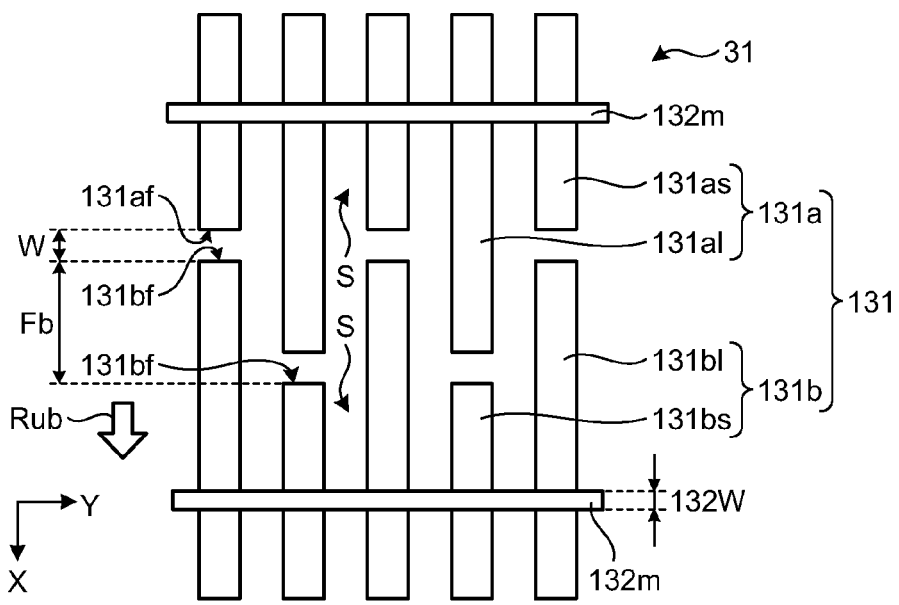
FIG. 15 is a schematic diagram for explaining a shape of a first electrode according to a third embodiment.

A liquid crystal display device 1 according to a third embodiment will be explained below. FIG. 15 is a schematic diagram for explaining a shape of a first electrode according to the third embodiment. The same letters or numerals are assigned to the same components as these explained in the first embodiment and the second embodiment, and overlapping explanation is therefore not repeated.

An electrode base portion 132m does not contribute to light transmission, and therefore a width 132W of the electrode base portion 132m in the X direction (direction perpendicular to the extending direction of the electrode base portion 132m) is preferably narrow. However, when the electrode base portion 132m is formed simultaneously with the first comb-shaped portion 131a and the second comb-shaped portion 131b, the width 132W of the electrode base portion 132m in the X direction is easy to become larger than the width of the first comb-shaped portion 131a and the second comb-shaped portion 131b in the Y direction due to wraparound of exposure light. Particularly, when the electrode base portion 132m is formed of the translucent electrode made of a translucent conductive material (translucent conductive oxide) such as ITO similar to the first comb-shaped portion 131a and the second comb-shaped portion 131b, the width 132W of the electrode base portion 132m in the X direction is easy to become larger than the width of the first comb-shaped portion 131a and the second comb-shaped portion 131b in the Y direction due to wraparound of exposure light.

Figure 16:
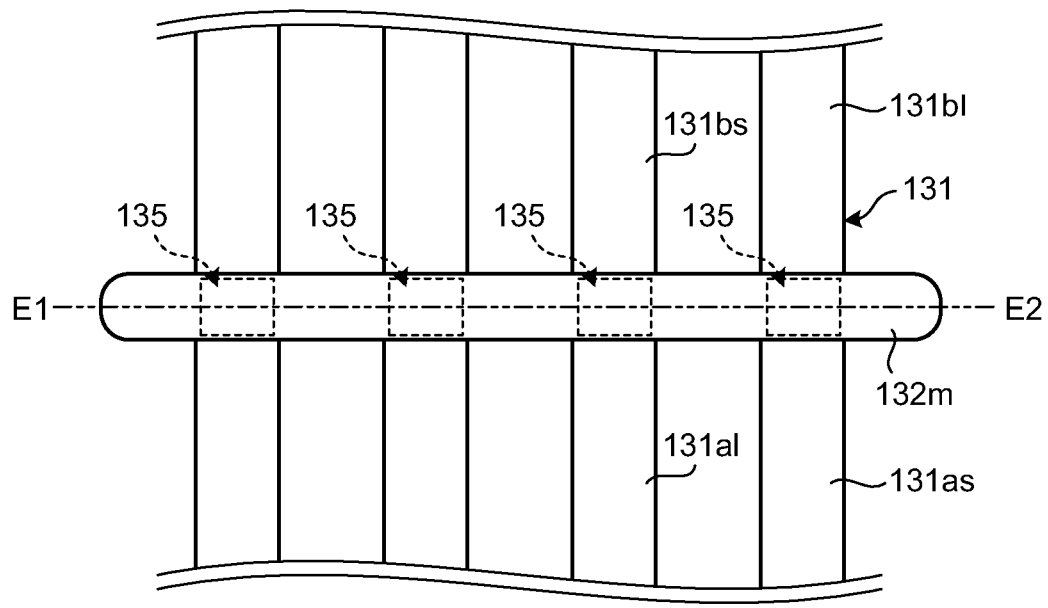
FIG. 16 is a schematic diagram for explaining the first electrode according to the third embodiment in detail.
Figure 17:
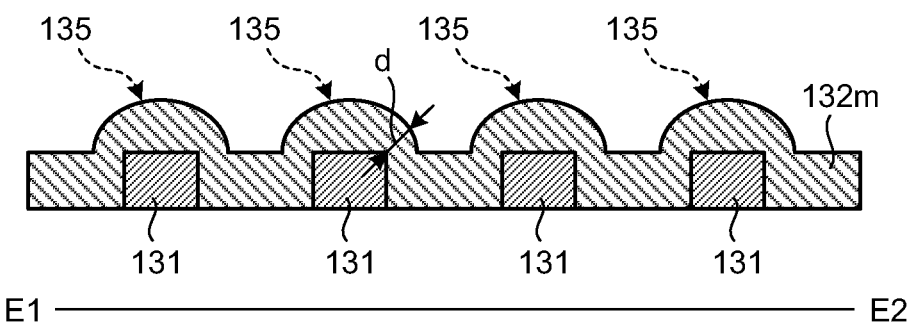
FIG. 17 is a schematic diagram of a cross section of line E1-E2 in FIG. 16.

FIG. 16 is a schematic diagram for explaining the first electrode according to the third embodiment in detail. FIG. 17 is a schematic diagram of a cross section of line E1-E2 in FIG. 16. As illustrated in FIG. 16 and FIG. 17, the comb-shaped portion 131 (the first comb-shaped portion 131a and the second comb-shaped portion 131b) according to the third embodiment has coupling portions 135 layered under the electrode base portion 132m. With this structure, a layer where the first comb-shaped portion 131a and the second comb-shaped portion 131b are formed by being exposed and a layer where the electrode base portion 132m is formed by being exposed are not formed at one time. Therefore, less influence of the exposure light for exposing the first comb-shaped portion 131a and the second comb-shaped portion 131b is exerted on the formation of the electrode base portion 132m, and the width 132W of the electrode base portion 132m in the X direction can be reduced even to the width or less of the first comb-shaped portion 131a and the second comb-shaped portion 131b in the Y direction. The liquid crystal display device 1 according to the third embodiment is capable of improving a response speed and reducing a light transmission loss due to the first electrode 31 by an amount of reduction of the width 132W.

The electrode base portion 132m is more preferably formed of a conductive metal material different from the translucent conductive material (translucent conductive oxide) such as ITO which is for the first comb-shaped portion 131a and the second comb-shaped portion 131b. As the conductive metal material, for example, aluminum (Al) and molybdenum (Mo) can be used. When the electrode base portion 132m is formed of the metal material, electrical resistance of the electrode base portion 132m lowers, so that the width 132W can be made thin. Moreover, when the electrode base portion 132m is formed of the metal material, a dry etching process of making thin the electrode base portion 132m can be easily applied thereto. Therefore, when the electrode base portion 132m is formed of the metal material, line thinning is facilitated.

Figure 18:
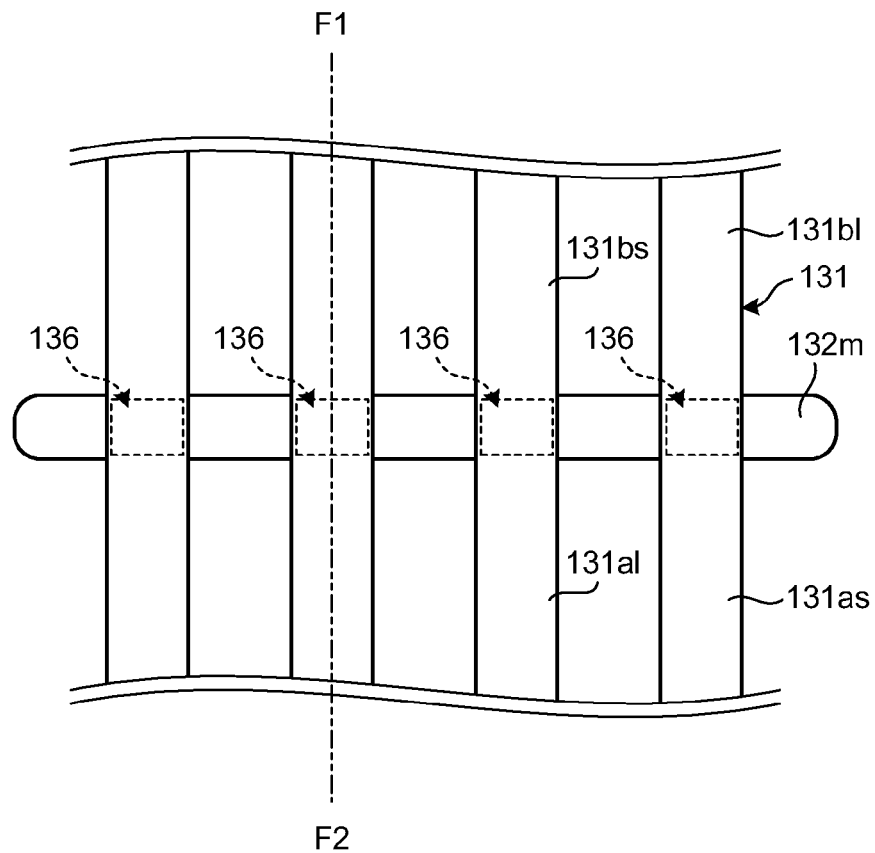
FIG. 18 is a schematic diagram for explaining a first modification of the first electrode according to the third embodiment in detail.
Figure 19:
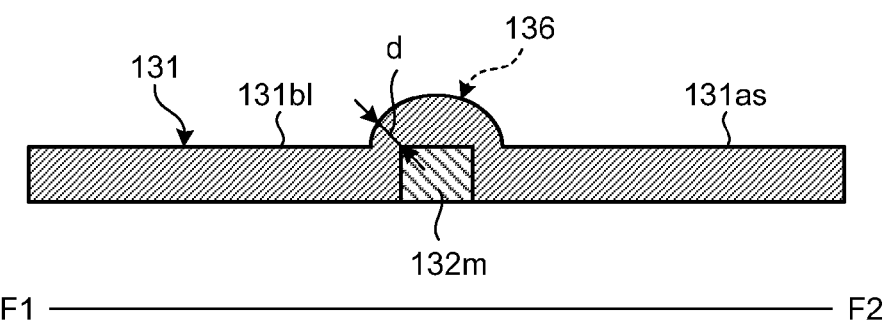
FIG. 19 is a schematic diagram of a cross section of line F1-F2 in FIG. 18.

As illustrated in FIG. 17, it is difficult to form the electrode base portion 132m on a corner portion of the comb-shaped portion 131 near the coupling portion 135, and a thickness d of the upper layer is more likely to become thinner. If the thickness d is small, the possibility of disconnection will occur. When the electrode base portion 132m is disconnected, it is quite possible that the disconnection is also simultaneously affected on the first comb-shaped portions 131a and on the second comb-shaped portions 131b connected to the electrode base portion 132m. Therefore, the first electrode 31 according to the third embodiment may be structured like a modification illustrated in FIG. 18 and FIG. 19. FIG. 18 is a schematic diagram for explaining a first modification of the first electrode according to the third embodiment in detail. FIG. 19 is a schematic diagram of a cross section of line F1-F2 in FIG. 18.

First Modification of Third Embodiment

As illustrated in FIG. 18 and FIG. 19, the comb-shaped portion 131 (the first comb-shaped portion 131a and the second comb-shaped portion 131b) according to a modification of the third embodiment is layered on the electrode base portion 132m and has coupling portions 136. With this structure, a layer where the first comb-shaped portion 131a and the second comb-shaped portion 131b are formed by being exposed and a layer where the electrode base portion 132m is formed by being exposed are not formed at one time. Therefore, less influence of the exposure light for exposing the first comb-shaped portion 131a and the second comb-shaped portion 131b is exerted on the formation of the electrode base portion 132m, and the width 132W of the electrode base portion 132m in the X direction can also be reduced to the width or less of the first comb-shaped portion 131a and the second comb-shaped portion 131b in the Y direction.

It is difficult to form the comb-shaped portion 131 on a corner portion of the electrode base portion 132m near the coupling portion 136, and a thickness d of the upper layer is more likely to become thinner. If the thickness d is small, the possibility of disconnection will occur. When the comb-shaped portion 131 is disconnected, the first comb-shaped portion 131a and the second comb-shaped portion 131b on which the influence is exerted is limited as compared with the case where the electrode base portion 132m is disconnected.

The electrode base portion 132m is more preferably formed of a metal material different from the translucent conductive material (translucent conductive oxide) such as ITO which is for the first comb-shaped portion 131a and the second comb-shaped portion 131b. As the metal material, the above mentioned materials can be used. When the electrode base portion 132m is formed of the metal material, electrical resistance of the electrode base portion 132m lowers, so that the width 132W can be made thin. Moreover, when the electrode base portion 132m is formed of the metal material, a dry etching process of making thin the electrode base portion 132m can be easily applied thereto. Therefore, when the electrode base portion 132m is formed of the metal material, line thinning is facilitated.

Second Modification of Third Embodiment

Figure 20:
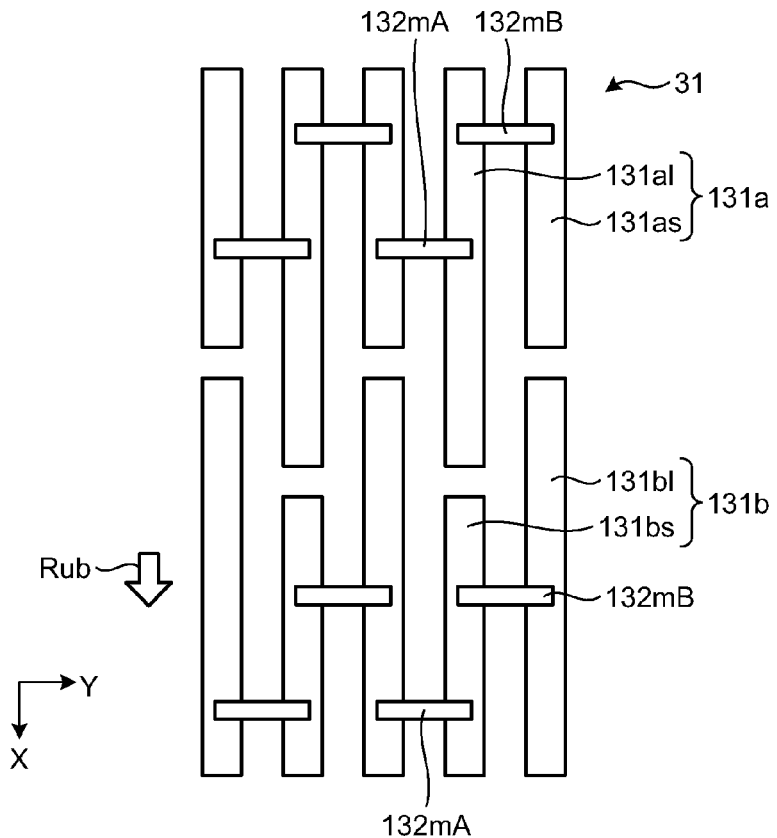
FIG. 20 is a schematic diagram for explaining a second modification of the first electrode according to the third embodiment in detail.

The liquid crystal display device 1 according to a second modification of the third embodiment will be explained below. FIG. 20 is a schematic diagram for explaining the second modification of the first electrode according to the third embodiment in detail. The same letters or numerals are assigned to the same components as these explained in the first embodiment and the second embodiment, and overlapping explanation is therefore not repeated.

Electrode base portions 132mA and 132mB according to the second modification of the third embodiment have a staggered arrangement in which they extend in the Y direction and positions thereof in the X direction are different from each other. The comb-shaped portion 131 (the first comb-shaped portion 131a and the second comb-shaped portion 131b) according to the second modification of the third embodiment has the coupling portions 135 layered under the electrode base portions 132 mA and 132 mB. Alternatively, the comb-shaped portion 131 (the first comb-shaped portion 131a and the second comb-shaped portion 131b) according to the second modification of the third embodiment may be layered on the electrode base portions 132 mA and 132 mB and have the coupling portions 136.

The electrode base portions 132 mA and 132 mB according to the second modification of the third embodiment are more preferably formed of a metal material. As the metal material, the above mentioned materials can be used.

1-4. Fourth Embodiment

Figure 21:
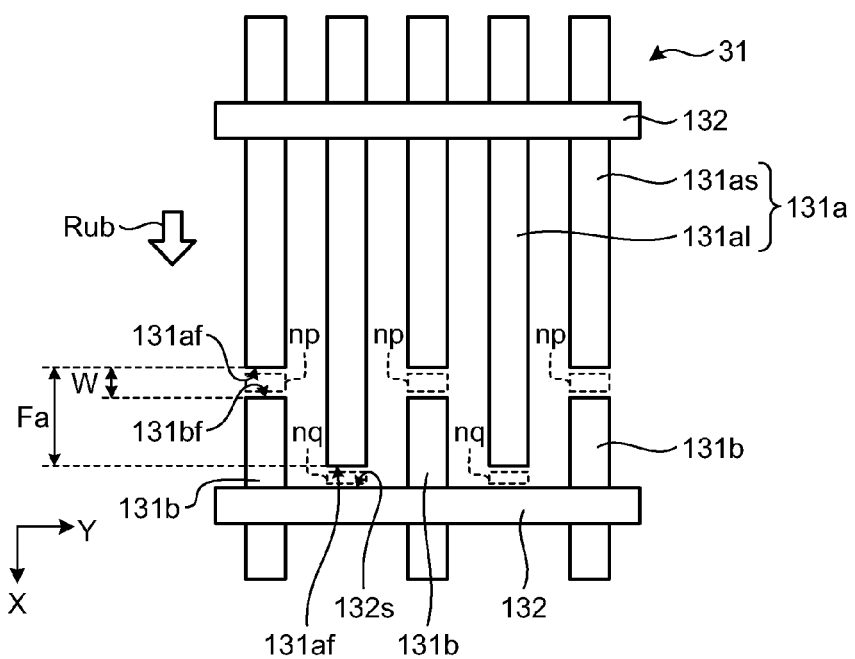
FIG. 21 is a schematic diagram for explaining a first electrode according to a fourth embodiment in detail.

A liquid crystal display device 1 according to a fourth embodiment will be explained below. FIG. 21 is a schematic diagram for explaining a first electrode according to a fourth embodiment in detail. The same letters or numerals are assigned to the same components as these explained in the first embodiment, the second embodiment, and the third embodiment, and overlapping explanation is therefore not repeated.

For the first electrode 31 according to the fourth embodiment, between the adjacent electrode base portions 132, the first comb-shaped portion 131 as and the second comb-shaped portion 131b face each other with interposition of the transmission ineffective area np where the translucent conductive material is not provided. Moreover, for the first electrode 31 according to the fourth embodiment, between the adjacent electrode base portions 132, the first comb-shaped portion 131a1 and a long side 132s of the electrode base portion 132 face each other with interposition of a transmission ineffective area nq where the translucent conductive material is not provided. A difference in length between the front edge 131af of the first comb-shaped portion 131 as and the front edge 131af of the first comb-shaped portion 131a1 is the length Fa.

A gap (distance) of the transmission ineffective area np illustrated in FIG. 21, i.e., a distance W between the front edge 131af of the first comb-shaped portion 131 as and the front edge 131bf of the second comb-shaped portion 131b is the same as a gap of the transmission ineffective area nq (a gap between the front edge 131af of the first comb-shaped portion 131a1 and the long side 132s of the electrode base portion 132).

In the first electrode 31 according to the fourth embodiment, the first comb-shaped portions 131a1 and the first comb-shaped portions 131 as alternately protrude from the electrode base portion 132 at a fixed distance away from each other. Therefore, there is the first comb-shaped portion 131a1 between the transmission ineffective areas np, and the transmission ineffective areas np are not continuously lined in a row along the Y direction. For example, the distance W of the transmission ineffective area np illustrated in FIG. 21 is made smaller than a length obtained by multiplying the length Fa by (½). With this structure, the transmission ineffective areas np are not continuously aligned on a straight line in the Y direction by sandwiching the first comb-shaped portion 131a1 therebetween. This causes the influence of the overlap of the diffracted lights to be decreased, thus reducing the possibility of widening the transmission ineffective area np.

1-5. Modifications

Modifications of the first, the second, the third, and the fourth embodiments will be explained below.

First Modification of Embodiments

Figure 22:
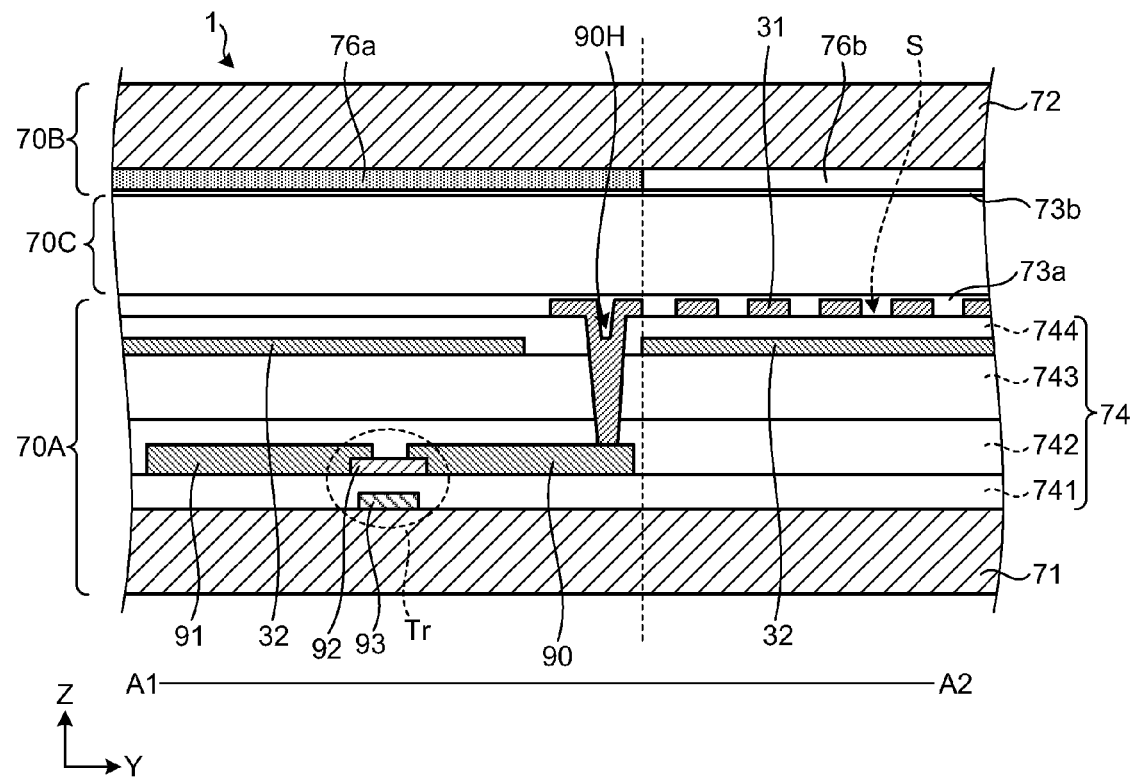
FIG. 22 is a schematic diagram of a modification of the cross section of line A1-A2 in FIG. 3A and FIG. 3B.

A liquid crystal display device 1 according to a first modification of the embodiments will be explained below. FIG. 22 is a schematic diagram of a modification of the cross section of line A1-A2 in FIG. 3A and FIG. 3B. The same letters or numerals are assigned to the same components as these explained in the first embodiment, and overlapping explanation is therefore not repeated.

The liquid crystal display device 1 according to the first modification of the embodiments is driven in the FFS mode in which an electric field (horizontal electric field) is formed in the direction parallel to the TFT substrate 71 between the first electrode 31 and the second electrode 32 layered in the direction (Z direction) vertical to the surface of the TFT substrate 71 of the pixel substrate 70A to thereby rotate the liquid crystal molecules of the liquid crystal layer 70C within a plane parallel to the substrate surface and the change in the light transmittance corresponding to the rotation of the liquid crystal molecules is used to perform display. For example, the second electrode 32 illustrated in FIG. 22 is the common electrode COM and the first electrode 31 is the pixel electrode. The first electrode 31 is coupled to the drain electrode 90 via, for example, the conductive contact 90H. The first electrode 31 has an independent pattern in which the first electrodes 31 are divided for each area of the pixel Vpix and each of them is insulated from the first electrode 31 in the area of adjacent pixels Vpix.

Second Modification of Embodiments

Figure 23:
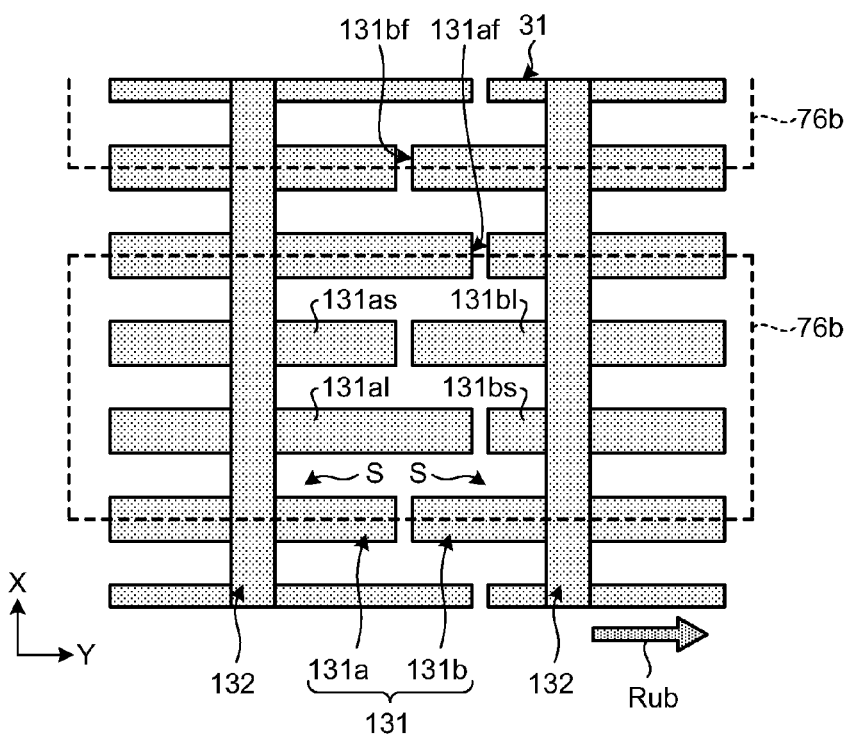
FIG. 23 is a schematic diagram for explaining the relation between the shape of the first electrode and the opening according to a second modification of the embodiments.

A liquid crystal display device 1 according to a second modification of the embodiments will be explained below. FIG. 23 is a schematic diagram for explaining the relation between the shape of the first electrode and the opening according to a second modification of the embodiments. The same letters or numerals are assigned to the same components as these explained in the first embodiment, and overlapping explanation is therefore not repeated.

The first electrode 31 has a plurality of comb-shaped portions 131 protruding from the electrode base portions 132 that extend in the X direction. Each of the comb-shaped portions 131 includes the first comb-shaped portion 131a and the second comb-shaped portion 131b that protrude from the adjacent electrode base portions 132 in opposite directions to each other. A plurality of first comb-shaped portions 131a protrude from each of the electrode base portions 132 at a fixed distance away from each other. Likewise, a plurality of second comb-shaped portions 131b protrude from each of the electrode base portions 132 at a fixed distance away from each other. From each of the electrode base portions 132, the first comb-shaped portions 131a extend along the Y direction and the second comb-shaped portions 131b extend along the Y direction but in the opposite direction to the extending direction of the first comb-shaped portions 131a.

Therefore, the first orientation film 73a is subjected to the rubbing process in the rubbing direction Rub illustrated in FIG. 23 so as to have the predetermined initial orientation characteristics in the Y direction. The second orientation film 73b is subjected to the rubbing process in an antiparallel direction to the rubbing direction Rub of the first orientation film 73a. The rubbing directions of the first orientation film 73a and the second orientation film 73b are antiparallel to each other. Further, the rubbing process may be replaced with other orientation process such as the photo-orientation process, as described above.

2. Application Examples

Application examples of the liquid crystal display device 1 as explained in the embodiments and the modifications thereof will be explained below with reference to FIG. 24 to FIG. 37. FIG. 24 to FIG. 37 are diagrams of examples of an electronic apparatus to which the liquid crystal display device according to one of the embodiments or the modifications thereof is applied. The liquid crystal display device 1 according to one of the embodiments or the modifications thereof can be applied to electronic apparatuses in all areas such as portable electronic apparatuses such as a mobile telephone and a smartphone, television devices, digital cameras, notebook personal computers, video cameras, or indicators mounted on vehicles. In other words, the liquid crystal display device 1 according to one of the embodiments or the modifications thereof can be applied to electronic apparatuses in all areas that display an externally input video signal or an internally generated video signal as an image or a video. The electronic apparatuses include a control device that supplies a video signal to the liquid crystal display device 1 to control operations of the liquid crystal display device 1.

Application Example 1

Figure 24:
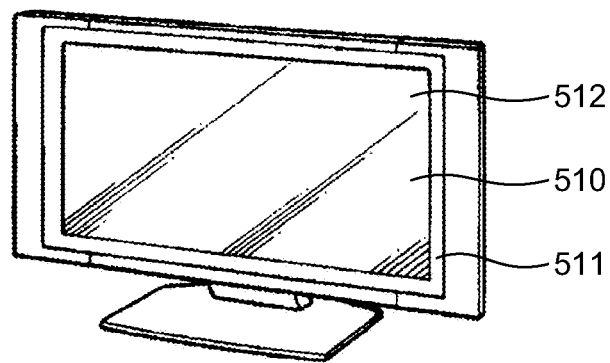
FIG. 24 is a diagram of an example of an electronic apparatus that applies the liquid crystal display device according to one of the embodiments or the modifications thereof.

The electronic apparatus illustrated in FIG. 24 is a television device to which the liquid crystal display device 1 according to one of the embodiments or the modifications thereof is applied. Examples of the television device include, but are not limited to, a video display screen unit 510 including a front panel 511 and a filter glass 512, and the video display screen unit 510 is the liquid crystal display device 1 according to one of the embodiments or the modifications thereof.

Application Example 2

Figure 25:
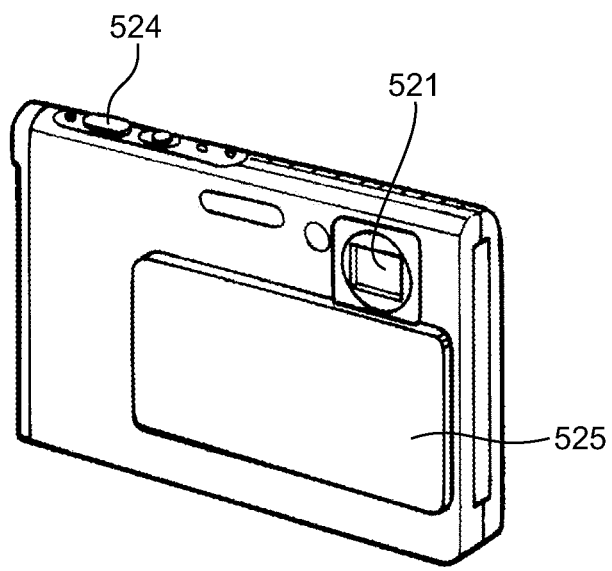
FIG. 25 is a diagram of an example of an electronic apparatus that applies the liquid crystal display device according to one of the embodiments or the modifications thereof.
Figure 26:
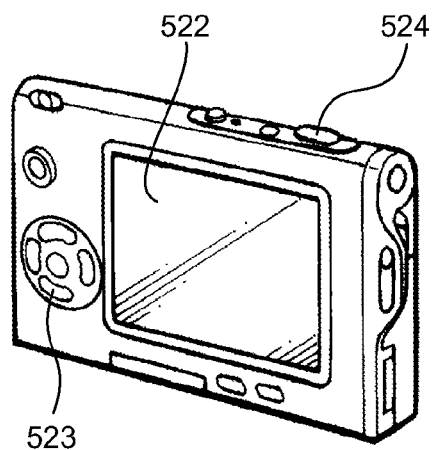
FIG. 26 is a diagram of an example of the electronic apparatus that applies the liquid crystal display device according to one of the embodiments or the modifications thereof.

The electronic apparatus illustrated in FIG. 25 and FIG. 26 is a digital camera to which the liquid crystal display device 1 according to one of the embodiments or the modifications thereof is applied. Examples of the digital camera include, but are not limited to, a light emitting unit 521 for a flash, a display unit 522, a menu switch 523, and a shutter button 524, and the display unit 522 is the liquid crystal display device 1 according to one of the embodiments or the modifications thereof. As illustrated in FIG. 25, the digital camera has a lens cover 525, and by sliding the lens cover 525, a photographing lens comes out. The digital camera is capable of taking digital photos by capturing light incident through the photographing lens.

Application Example 3

Figure 27:
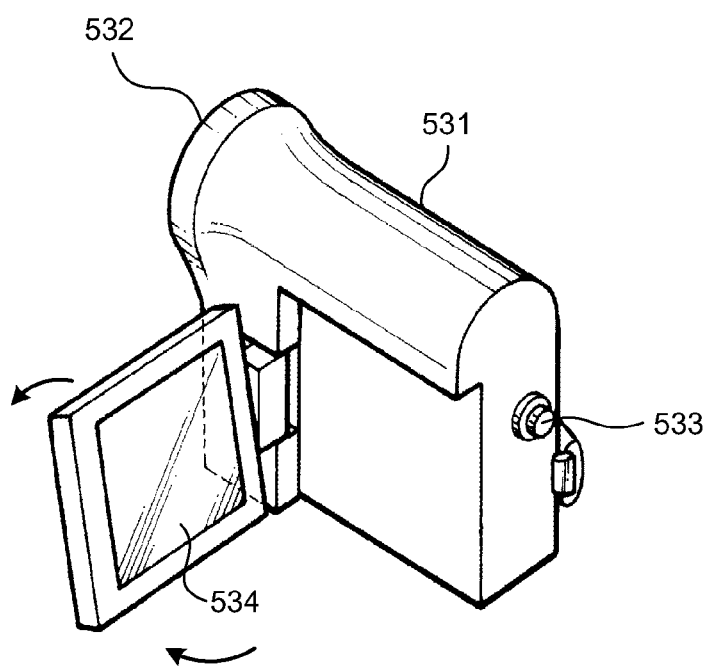
FIG. 27 is a diagram of an example of an electronic apparatus that applies the liquid crystal display device according to one of the embodiments or the modifications thereof.

The electronic apparatus illustrated in FIG. 27 represents an appearance of a video camera to which the liquid crystal display device 1 according to one of the embodiments or the modifications thereof is applied. Examples of the video camera include, but are not limited to, a main body 531, a lens 532 for photographing a subject provided on the front side face of the main body 531, a start/stop switch 533 in photographing, and a display unit 534. The display unit 534 is the liquid crystal display device 1 according to one of the embodiments or the modifications thereof.

Application Example 4

Figure 28:
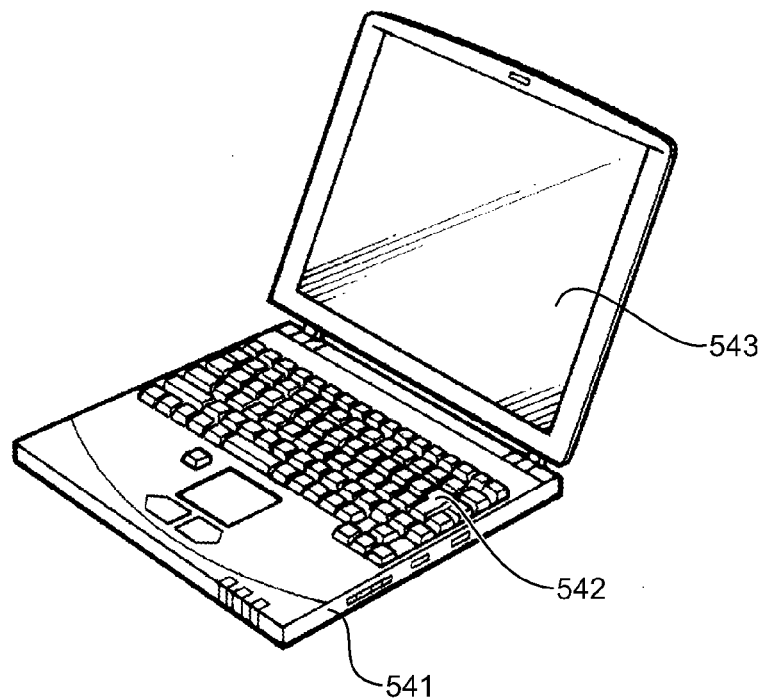
FIG. 28 is a diagram of an example of an electronic apparatus that applies the liquid crystal display device according to one of the embodiments or the modifications thereof.

The electronic apparatus illustrated in FIG. 28 is a notebook personal computer to which the liquid crystal display device 1 according to one of the embodiments or the modifications thereof is applied. Examples of the notebook personal computer include, but are not limited to, a main body 541, a keyboard 542 for performing an input operation of text and the like, and a display unit 543 for displaying an image. The display unit 543 includes the liquid crystal display device 1 according to one of the embodiments or the modifications thereof.

Application Example 5

Figure 29:
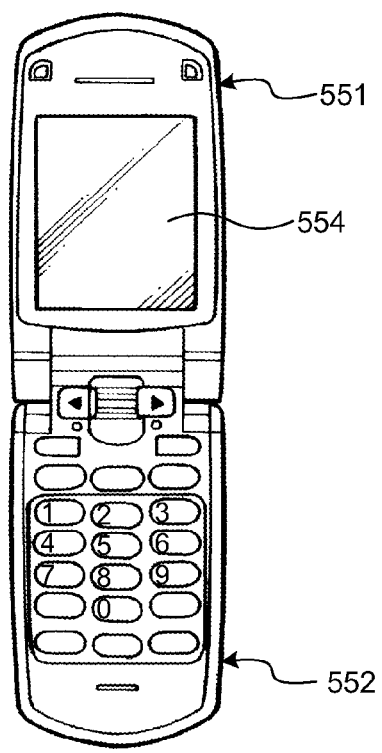
FIG. 29 is a diagram of an example of an electronic apparatus that applies the liquid crystal display device according to one of the embodiments or the modifications thereof.
Figure 30:
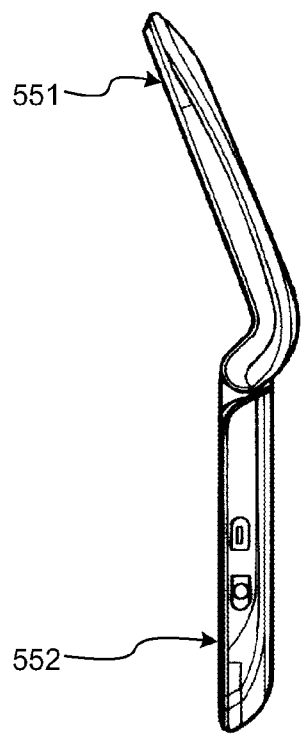
FIG. 30 is a diagram of an example of the electronic apparatus that applies the liquid crystal display device according to one of the embodiments or the modifications thereof.
Figure 31:
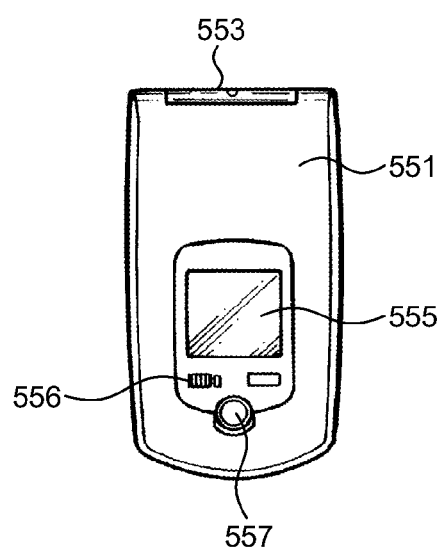
FIG. 31 is a diagram of an example of the electronic apparatus that applies the liquid crystal display device according to one of the embodiments or the modifications thereof.
Figure 32:
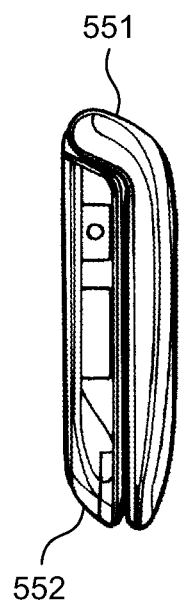
FIG. 32 is a diagram of an example of the electronic apparatus that applies the liquid crystal display device according to one of the embodiments or the modifications thereof.
Figure 33:
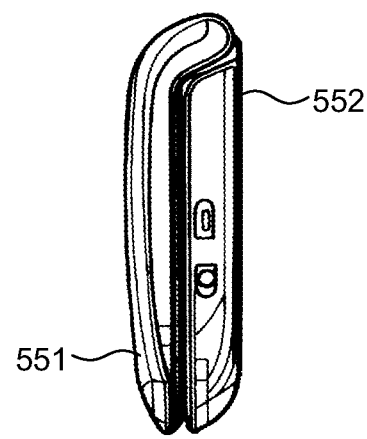
FIG. 33 is a diagram of an example of the electronic apparatus that applies the liquid crystal display device according to one of the embodiments or the modifications thereof.
Figure 34:
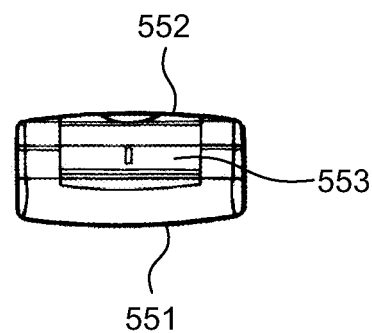
FIG. 34 is a diagram of an example of the electronic apparatus that applies the liquid crystal display device according to one of the embodiments or the modifications thereof.
Figure 35:
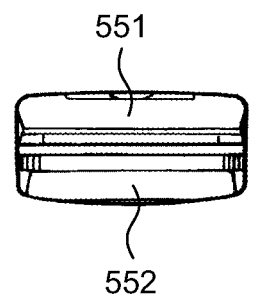
FIG. 35 is a diagram of an example of the electronic apparatus that applies the liquid crystal display device according to one of the embodiments or the modifications thereof.

The electronic apparatus illustrated in FIG. 29 to FIG. 35 is a mobile phone to which the liquid crystal display device 1 is applied. FIG. 29 is a front view of the mobile phone in its opened state, FIG. 30 is a right side view of the mobile phone in the opened state, FIG. 31 is a front view of the mobile phone in its folded state, FIG. 32 is a left side view of the mobile phone in the folded state, FIG. 33 is a right side view of the mobile phone in the folded state, FIG. 34 is a top view of the mobile phone in the folded state, and FIG. 35 is a bottom view of the mobile phone in the folded state. The mobile phone is the one that has, for example, an upper housing 551 and a lower housing 552 connected to each other with a connecting unit (hinge unit) 553, and that includes a display 554, a sub-display 555, a picture light 556, and a camera 557. The liquid crystal display device 1 is mounted on the display 554. Therefore, the display 554 of the mobile phone may have a function of detecting a touch operation in addition to a function of displaying images.

Application Example 6

Figure 36:
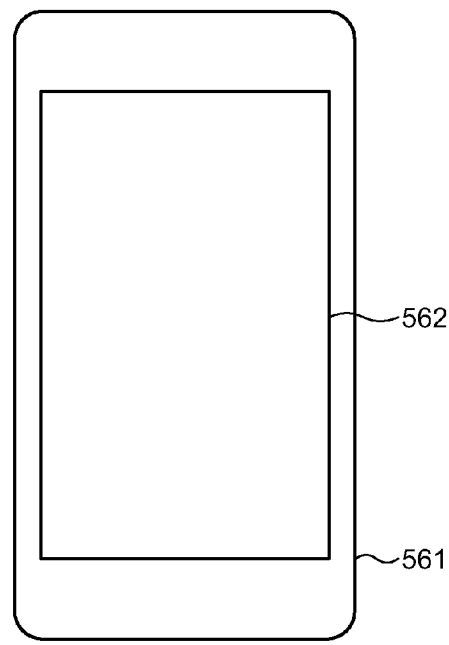
FIG. 36 is a diagram of an example of an electronic apparatus that applies the liquid crystal display device according to one of the embodiments or the modifications thereof.

The electronic apparatus illustrated in FIG. 36 is a portable information terminal that operates as a portable computer, a multifunctional mobile phone, a portable computer capable of performing voice communication, or as a portable computer capable of performing communication, and that is sometimes referred to as so-called a smartphone or a tablet terminal. The portable information terminal has a display unit 562 on the surface of, for example, a housing 561. The display unit 562 is the liquid crystal display device 1 according to one of the embodiments or the modifications thereof.

Application Example 7

Figure 37:
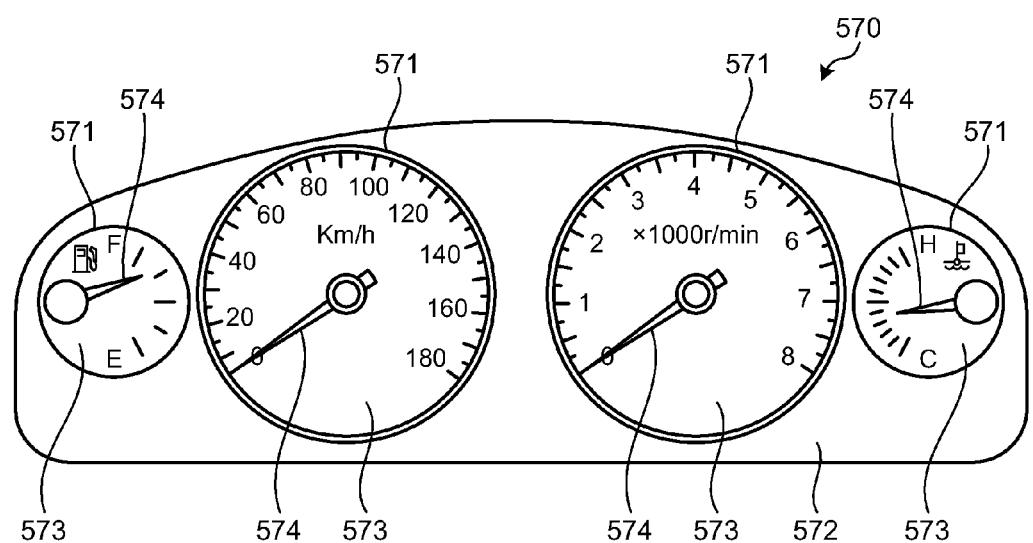
FIG. 37 is an overall configuration diagram of a meter unit that applies the liquid crystal display device according to one of the embodiments or the modifications thereof.

FIG. 37 is a schematic configuration diagram of a meter unit according to one of the embodiments or the modifications thereof. A meter unit (electronic apparatus) 570 illustrated in FIG. 37 includes a plurality of liquid crystal display devices 1 according to one of the embodiments or the modifications thereof such as a fuel meter, a water temperature meter, a speed meter, and a tachometer as liquid crystal display devices 571. All the liquid crystal display devices 571 are covered with a piece of face panel 572.

Each of the liquid crystal display devices 571 illustrated in FIG. 37 is structured to combine a liquid crystal panel 573 as a liquid crystal displaying unit with a movement mechanism as an analog displaying unit. The movement mechanism includes a motor as a driving unit and an indicator 574 rotated by the motor. As illustrated in FIG. 37, each of the liquid crystal display devices 571 is capable of displaying scale marks, warning, or the like on the display surface of the liquid crystal panel 573 and also capable of rotating the indicator 574 of the movement mechanism on the display surface side of the liquid crystal panel 573.

FIG. 37 is a structure with the liquid crystal display devices 571 provided on one piece of face panel 572; however, the embodiment is not limited thereto. A unit of liquid crystal display device 571 is provided on an area surrounded by the face panel, and the fuel meter, the water temperature meter, the speed meter, the tachometer, or so may be displayed on the liquid crystal display device 571.

3. Aspects of Present Disclosure

The present disclosure includes aspects as follows.

(1) A liquid crystal display device comprising:
a first substrate and a second substrate that face each other;
a liquid crystal layer provided between the first substrate and the second substrate; and
a first electrode and a second electrode provided between the first substrate and the liquid crystal layer, wherein
the first electrode includes:
a plurality of electrode base portions that extend in a first direction;
a plurality of first comb-shaped portions that protrude from each of the plurality of electrode base portions at a fixed distance away in the first direction from each other in a comb-teeth manner, and extend in a second direction different from the first direction; and
a plurality of second comb-shaped portions that protrude from each of the plurality of electrode base portions at a fixed distance away in the first direction from each other in a comb-teeth manner, and extend in an opposite direction to the second direction, and
front edges of the first comb-shaped portions and the second comb-shaped portions that extend from the adjacent electrode base portions face each other with a gap therebetween, respectively,
transmission ineffective areas are formed at portions between the front edges facing each other, respectively, and
the transmission ineffective areas are not continuously aligned in the first direction.

(2) The liquid crystal display device according to (1), wherein the first electrode includes the first comb-shaped portions in which protruded lengths from the electrode base portion are different from each other.

(3) The liquid crystal display device according to (2), wherein the gap is smaller than ½ of a difference between the protruded lengths of the first comb-shaped portions.

(4) The liquid crystal display device according claim 1, wherein the first electrode and the second electrode are arranged such that a horizontal electric field for driving the liquid crystal layer is generated.

(5) The liquid crystal display device according to (4), wherein the first electrode is layered over the second electrode with an insulating layer interposed.

(6) The liquid crystal display device according to (1), wherein when a voltage is applied between the first electrode and the second electrode,
in a region where long sides of the first comb-shaped portions are adjacent to each other, liquid crystal molecules in an area near one of the long sides and liquid crystal molecules in an area near the other one of the long sides rotate in opposite directions to each other with respect to the second direction.

(7) The liquid crystal display device according to (1), wherein the first electrode includes the first comb-shaped portions in which protruded lengths from the electrode base portion are different from each other and the second comb-shaped portions in which protruded lengths from the electrode base portion are different from each other, and when a voltage is applied between the first electrode and the second electrode, in a region where long sides of the first comb-shaped portion and the second comb-shaped portion are adjacent to each other, liquid crystal molecules in areas respectively near the long sides rotate in a same direction to each other with respect to the second direction.

(8) The liquid crystal display device according to (1), further comprising:

a first orientation film provided between the first electrode and the liquid crystal layer; and a second orientation film provided between the second substrate and the liquid crystal layer, wherein the first orientation film is subjected to an orientation process in a first orientation direction that is a parallel direction to the second direction, the second orientation film is subjected to an orientation process in a second orientation direction that is an opposite direction to the first orientation direction of the first orientation film, and when a voltage is not applied between the first electrode and the second electrode, long axes of liquid crystal molecules in the liquid crystal layer are aligned and oriented in the first orientation direction.

(9) The liquid crystal display device according to (8), wherein when a voltage is applied between the first electrode and the second electrode, the long axis of the liquid crystal molecules are oriented to rise toward a direction vertical to the first substrate while rotating clockwise in an in-plane direction of the first substrate in an area near one of the long sides of the adjacent first comb-shaped portions and rotating counterclockwise in the in-plane direction of the first substrate in an area near the other one.

(10) The liquid crystal display device according to (1), wherein the first comb-shaped portion or the second comb-shaped portion has a coupling portion on which or below which the electrode base portion is layered.

(11) The liquid crystal display device according to (1), wherein the electrode base portion is formed of a translucent conductive material.

(12) The liquid crystal display device according to (1), wherein the electrode base portion is formed of a metal material.

(13) The liquid crystal display device according to (1), wherein the comb-shaped portion is formed of a translucent conductive material.

(14) The liquid crystal display device according to (1), wherein the electrode base portion is formed in a lower layer than the coupling portion.

(15) An electronic apparatus comprising:

a liquid crystal display device according to (1); and a control device that supplies an input signal to the liquid crystal display device.

According to the present disclosure, it is possible to provide the liquid crystal display device and the electronic apparatus capable of improving a response speed and reducing a light transmission loss.

What is claimed is:

1. A liquid crystal display device comprising:

a first substrate and a second substrate that face each other;

a liquid crystal layer provided between the first substrate and the second substrate; and a first electrode and a second electrode provided between the first substrate and the liquid crystal layer, wherein the first electrode includes:

a first electrode based portion and a second electrode base portion that extend in a first direction and that face each other in a second direction different from the first direction;

a plurality of first comb-shaped portions that protrude from the first electrode base portion at a fixed distance away in the first direction from each other in a comb-teeth manner and that extend to first front edges of the first comb-shaped portions in the second direction; and a plurality of second comb-shaped portions that protrude from the second electrode base portion at a fixed distance away in the first direction from each other in a comb-teeth manner and that extend to second front edges of the second comb-shapes portions in an opposite direction to the second direction, and wherein each of the first front edges faces each of the second front edges with a predetermined gap therebetween;

wherein the first comb-shaped portions have protruded lengths from the first electrode base portion to the first front edges, and the protruded lengths of adjacent first comb-shaped portions are different from each other, wherein positions of the first front edges of the adjacent first comb-shaped portions are different in the second direction, and wherein the predetermined gap is smaller than ½ of a difference between the protruded lengths of the adjacent first comb-shaped portions.

2. The liquid crystal display device according claim 1, wherein the first electrode and the second electrode are arranged such that a horizontal electric field for driving the liquid crystal layer is generated.

3. The liquid crystal display device according to claim 2, wherein the first electrode is layered over the second electrode with an insulating layer interposed.

4. The liquid crystal display device according to claim 1, wherein when a voltage is applied between the first electrode and the second electrode, in a region where long sides of the first comb-shaped portions are adjacent to each other, liquid crystal molecules in an area near one of the long sides and liquid crystal molecules in an area near the other one of the long sides rotate in opposite directions to each other with respect to the second direction.

5. The liquid crystal display device according to claim 1, wherein the second comb-shaped portions have protruded lengths from the second electrode base portion to the second front edges, and the protruded lengths of adjacent second comb-shaped portions are different from each other, wherein positions of the second front edges of the adjacent second comb-shaped portions are different in the second direction, and wherein, when a voltage is applied between the first electrode and the second electrode, in a region where long sides of the first comb-shaped portion and the second comb-shaped portion are adjacent to each other, liquid crystal molecules in areas respectively near the long sides rotate in a same direction to each other with respect to the second direction.

6. The liquid crystal display device according to claim 1, further comprising:
a first orientation film provided between the first electrode and the liquid crystal layer; and
a second orientation film provided between the second substrate and the liquid crystal layer, wherein
the first orientation film is subjected to an orientation process in a first orientation direction that is a parallel direction to the second direction,
the second orientation film is subjected to an orientation process in a second orientation direction that is an opposite direction to the first orientation direction of the first orientation film, and
when a voltage is not applied between the first electrode and the second electrode,
long axes of liquid crystal molecules in the liquid crystal layer are aligned and oriented in the first orientation direction.

7. The liquid crystal display device according to claim 6, wherein when a voltage is applied between the first electrode and the second electrode,
the long axis of the liquid crystal molecules are oriented to rise toward a direction vertical to the first substrate while rotating clockwise in an in-plane direction of the first substrate in an area near one of the long sides of the adjacent first comb-shaped portions and rotating counterclockwise in the in-plane direction of the first substrate in an area near the other one.

8. The liquid crystal display device according to claim 1, wherein each of the first comb-shaped portions or the second comb-shaped portions has a coupling portion on which or below which the first electrode base portion or the second electrode base portion is layered.

9. The liquid crystal display device according to claim 1, wherein the first electrode base portion and the second electrode base portion are formed of a translucent conductive material.

10. The liquid crystal display device according to claim 1, wherein the first electrode base portion and the second electrode base portion are formed of a metal material.

11. The liquid crystal display device according to claim 1, wherein the first comb-shaped portions and the second comb-shaped portions are formed of a translucent conductive material.

12. The liquid crystal display device according to claim 1, wherein the first electrode base portion and the second base electrode portion are formed in a lower layer than the coupling portion.

13. An electronic apparatus comprising:
a liquid crystal display device according to claim 1; and
a control device that supplies an input signal to the liquid crystal display device.

* * * * *